(12) United States Patent
Nagai et al.

(10) Patent No.: US 9,184,442 B2
(45) Date of Patent: *Nov. 10, 2015

(54) SECONDARY BATTERY

(75) Inventors: Hiroki Nagai, Nagoya (JP); Masahiro Morita, Toyota (JP); Takashi Iwao, Kadoma (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 172 days.

This patent is subject to a terminal disclaimer.

(21) Appl. No.: 13/884,628

(22) PCT Filed: Nov. 12, 2010

(86) PCT No.: PCT/JP2010/070242
§ 371 (c)(1),
(2), (4) Date: Jul. 11, 2013

(87) PCT Pub. No.: WO2012/063369
PCT Pub. Date: May 18, 2012

(65) Prior Publication Data
US 2013/0295456 A1    Nov. 7, 2013

(51) Int. Cl.
*H01M 4/485* (2010.01)
*H01M 4/131* (2010.01)
*H01M 4/1391* (2010.01)
*H01M 10/0525* (2010.01)
(Continued)

(52) U.S. Cl.
CPC ............. *H01M 4/485* (2013.01); *H01M 4/131* (2013.01); *H01M 4/1391* (2013.01); *H01M 10/0525* (2013.01); *H01M 10/0587* (2013.01); *H01M 2004/021* (2013.01); *Y02E 60/122* (2013.01)

(58) Field of Classification Search
None
See application file for complete search history.

(56) References Cited

U.S. PATENT DOCUMENTS

| 5,702,845 | A | 12/1997 | Kawakami et al. |
| 2005/0221182 | A1 | 10/2005 | Fujiwara et al. |
| 2007/0003835 | A1* | 1/2007 | Hasegawa et al. ........ 429/231.95 |

(Continued)

FOREIGN PATENT DOCUMENTS

| CN | 102612772 | 7/2012 |
| JP | 10-255763 | 9/1998 |

(Continued)

OTHER PUBLICATIONS

Office Action for U.S. Appl. No. 13/884,645 dated Mar. 10, 2015.
(Continued)

*Primary Examiner* — Gregg Cantelmo
(74) *Attorney, Agent, or Firm* — Finnegan, Henderson, Farabow, Garrett & Dunner, LLP

(57) ABSTRACT

A secondary battery 100 includes a positive electrode current collector 221 and a positive electrode mixture layer 223 coated on the positive electrode current collector 221. The positive electrode mixture layer 223 includes a positive electrode active material 610 and an electrically conductive material 620. A ratio (Vb/Va) of a volume Vb of holes formed inside the positive electrode mixture layer 223 to an apparent volume Va of the positive electrode mixture layer 223 satisfies 0.30≤(Vb/Va). In addition, in a micropore distribution of differential micropore volume with respect to a micropore diameter as measured by the mercury intrusion method, the positive electrode mixture layer 223 has a first peak at which a micropore diameter D1 satisfies D1≤0.25 μm and a second peak at which a micropore diameter D2 is greater than the first peak micropore diameter D1.

15 Claims, 15 Drawing Sheets

(51) Int. Cl.
*H01M 10/0587* (2010.01)
*H01M 4/02* (2006.01)

(56) References Cited

U.S. PATENT DOCUMENTS

| | | |
|---|---|---|
| 2008/0241701 A1 | 10/2008 | Okumura et al. |
| 2012/0282525 A1 | 11/2012 | Nagai et al. |

FOREIGN PATENT DOCUMENTS

| | | |
|---|---|---|
| JP | 11-31534 | 2/1999 |
| JP | 2001-110424 | 4/2001 |
| JP | 2001-332246 | 11/2001 |
| JP | 2003-272609 | 9/2003 |
| JP | 2005-285606 | 10/2005 |
| JP | 2007-109636 | 4/2007 |
| JP | 2009-123671 | 6/2009 |
| JP | 2010-15904 | 1/2010 |
| JP | 2010-97813 | 4/2010 |
| JP | 2011-119092 | 6/2011 |

OTHER PUBLICATIONS

Final Office Action for U.S. Appl. No. 13/884,645 dated Aug. 17, 2015.

* cited by examiner

SECONDARY BATTERY

CROSS-REFERENCE TO RELATED APPLICATIONS

This application is a national phase application of International Application No. PCT/JP2010/070242, filed Nov. 12, 2010, the content of which is incorporated herein by reference.

TECHNICAL FIELD

The present invention relates to a secondary battery. Examples of a secondary battery include a lithium-ion secondary battery.

In the present specification, "secondary battery" is a term which describes repetitively chargeable storage devices in general and which encompasses so-called storage batteries such as a lithium-ion secondary battery, a nickel hydride battery, and a nickel-cadmium battery as well as storage elements such as an electrical double layer capacitor.

In addition, in the present specification, the term "lithium-ion secondary battery" encompasses secondary batteries which use lithium ions as electrolyte ions and in which charging and discharging are realized by the movement of electrons accompanying lithium ions between a positive electrode and a negative electrode.

BACKGROUND ART

For example, Patent Literature 1 described below discloses a non-aqueous electrolyte solution secondary battery comprising a positive electrode, a negative electrode that stores and releases lithium ions, and a non-aqueous electrolyte solution. More specifically, the positive electrode is structured such that a positive electrode layer including a lithium complex metal oxide containing nickel and a vinylidene fluoride-based fluoro-rubber is supported by a current collector. In addition, as measured by the mercury intrusion method, the positive electrode layer has a porosity of 20% to 50% and a pore volume of 10 mm$^3$/g to 150 mm$^3$/g with respect to pores in a diameter range of 0.1 μm to 3 μm. Patent Literature 1 describes that, due to this configuration, a non-aqueous electrolyte solution secondary is obtained which has a high energy density and which is superior in both large-current discharge characteristics and charge-discharge cycling characteristics.

CITATION LIST

Patent literature

Patent Literature 1: Japanese Patent Application Laid-open No. H10-255763

SUMMARY OF INVENTION

In recent years, in applications of secondary batteries as typified by a lithium-ion secondary battery in which the secondary battery is used mounted on an automobile as a drive source, the secondary battery is required to produce output that is significantly higher than in applications related to portable terminals and home electric appliances. The present invention proposes a novel construction that enables a secondary battery to produce high output characteristics.

A secondary battery according to the present invention comprises a current collector and a positive electrode mixture layer coated on the current collector. The positive electrode mixture layer includes a positive electrode active material and an electrically conductive material. A ratio (Vb/Va) of a volume Vb of holes formed inside the positive electrode mixture layer to an apparent volume Va of the positive electrode mixture layer satisfies 0.30≤(Vb/Va). In addition, in a micropore distribution of differential micropore volume with respect to a micropore diameter as measured by the mercury intrusion method, the positive electrode mixture layer has a first peak at which a micropore diameter D1 satisfies D1≤0.25 μm and a second peak at which a micropore diameter D2 is greater than the first peak micropore diameter D1.

According to this secondary battery, the ratio (Vb/Va) of the volume Vb of holes formed inside the positive electrode mixture layer to the apparent volume Va of the positive electrode mixture layer is relatively large. The ratio (Vb/Va) represents a ratio of holes in the positive electrode mixture layer and indicates the ease by which an electrolyte solution can penetrate. A relatively large ratio (Vb/Va) means that the electrolyte solution can penetrate with ease and resistance to an electrochemical reaction between the positive electrode active material and the electrolyte solution is low. In addition, the first peak micropore diameter D1 of the secondary battery is relatively small. The first peak micropore diameter D1 is conceivably correlated to a size of holes in the electrically conductive material in the positive electrode mixture layer. Therefore, a small first peak micropore diameter D1 conceivably means that the electrically conductive material is densely aggregated and resistance to electron transfer is low. For these reasons, the construction described above is capable of improving high-rate output characteristics of a secondary battery.

Furthermore, in this case, a diameter attributable to holes in the electrically conductive material in the positive electrode mixture layer can be adopted as the first peak micropore diameter D1, and a diameter attributable to holes between particles of the positive electrode active material can be adopted as the second peak micropore diameter D2. The ratio (Vb/Va) of the volume Vb of holes formed inside the positive electrode mixture layer to the apparent volume Va of the positive electrode mixture layer may satisfy 0.38≤(Vb/Va). Due to the ratio (Vb/Va) satisfying 0.38≤(Vb/Va), the electrolyte solution can penetrate into the positive electrode mixture layer with greater ease and resistance to an electrochemical reaction between the positive electrode active material and the electrolyte solution further declines. In addition, the micropore diameter D1 may satisfy D1≤0.18 μm. Accordingly, since the electrically conductive material becomes more densely aggregated and resistance to electron transfer further declines, high-rate output characteristics of the secondary battery can be further improved.

Furthermore, while an upper limit of the ratio (Vb/Va) is not particularly set, for example, the ratio (Vb/Va) may satisfy (Vb/Va)≤0.65. In addition, while a lower limit of the first peak micropore diameter D1 is not particularly set, for example, the first peak micropore diameter D1 may satisfy 0.05 μm≤D1.

Moreover, a DBP absorption B of the positive electrode active material may be 30 (mL/100 g)≤B. In addition, a DBP absorption D of the electrically conductive material may satisfy 100 (mL/100 g)≤D. By using materials with a relatively high DBP absorption (mL/100 g) as the positive electrode active material and the electrically conductive material, the positive electrode active material and the electrically conductive material favorably have a relatively high DBP absorption (mL/100 g).

The positive electrode active material may have secondary particles formed by an aggregation of a plurality of primary particles of a lithium transition metal oxide and a hollow portion formed in the secondary particles. With such a hollow structure, the ratio (Vb/Va) described above can be improved. Furthermore, the positive electrode active material may have through holes penetrating the secondary particles so as to connect the hollow portion and the outside. Such a holed hollow structure enables easy penetration of the electrolyte solution into the hollow portion and reduces the risk of occurrence of a phenomenon in which the electrolyte solution becomes insufficient inside the secondary particles.

Moreover, in this case, an opening width of the through holes may be on average 0.01 μm or more. Due to the through holes being relatively large, the penetration of the electrolyte solution into the hollow portion becomes even easier. In addition, the opening width of the through holes may be, for example, on average 2.0 μm or less.

Furthermore, the positive electrode active material may be a positive electrode active material produced by a production method comprising: a raw material hydroxide formation step of supplying ammonium ions to an aqueous solution of a transition metal compound, and precipitating particles of the transition metal hydroxide from the aqueous solution, the aqueous solution containing at least one transition metal element that composes the lithium transition metal oxide; a mixing step of mixing the transition metal hydroxide with a lithium compound to prepare an unfired mixture; and a calcining step of calcining the mixture to obtain the active material particles. Accordingly, the positive electrode active material with the holed hollow structure described above can also be appropriately created.

In addition, the raw material hydroxide formation step may include a nucleation stage in which the transition metal hydroxide is precipitated from the aqueous solution at pH 12 or higher and at an ammonium ion concentration of 25 g/L or less and a particle growth stage in which the transition metal hydroxide precipitated in the nucleation stage is grown at a pH of less than 12 and at an ammonium ion concentration of 3 g/L or more.

Furthermore, the secondary battery production method may comprise: a coating step of coating a current collector with a positive electrode mixture containing a positive electrode active material and an electrically conductive material; a drying step of drying the positive electrode mixture coated on the current collector in the coating step; and a rolling step of rolling the positive electrode mixture layer dried in the drying step. A rolling quantity of the rolling step is adjusted within a range of a squeeze rate X satisfying $0.09 \leq X \leq 0.60$ so that a positive electrode mixture layer that satisfies condition 1 and condition 2 below is obtained after the rolling step. In this case, the squeeze rate X is a value obtained by dividing a variation $\Delta T$, by which a thickness of the positive electrode mixture layer has varied due to the rolling step, by a thickness T0 of the positive electrode mixture layer prior to the rolling step. In addition, condition 1 requires that a ratio (Vb/Va) of a volume Vb of holes formed inside the positive electrode mixture layer after the rolling step to an apparent volume Va of the positive electrode mixture layer after the rolling step satisfies $0.30 \leq (Vb/Va)$. Furthermore, condition 2 requires that, in a micropore distribution of differential micropore volume with respect to micropore diameter as measured by the mercury intrusion method, the positive electrode mixture layer after rolling in the rolling step has a first peak at which a micropore diameter D1 satisfies $D1 \leq 0.25$ μm and a second peak at which a micropore diameter D2 is greater than the first peak micropore diameter D1.

Moreover, in the rolling step, the rolling quantity may be adjusted so that the squeeze rate X satisfies $0.2 \leq X$. Accordingly, the first peak micropore diameter D1 can be reduced to a certain extent. In addition, a density of the positive electrode mixture layer prior to the rolling step may be 1.8 or lower. By lowering the density of the positive electrode mixture layer prior to the rolling step to a certain extent, a positive electrode mixture layer with a higher ratio (Vb/Va) can be more readily obtained.

DESCRIPTION OF EMBODIMENTS

Figure 1:
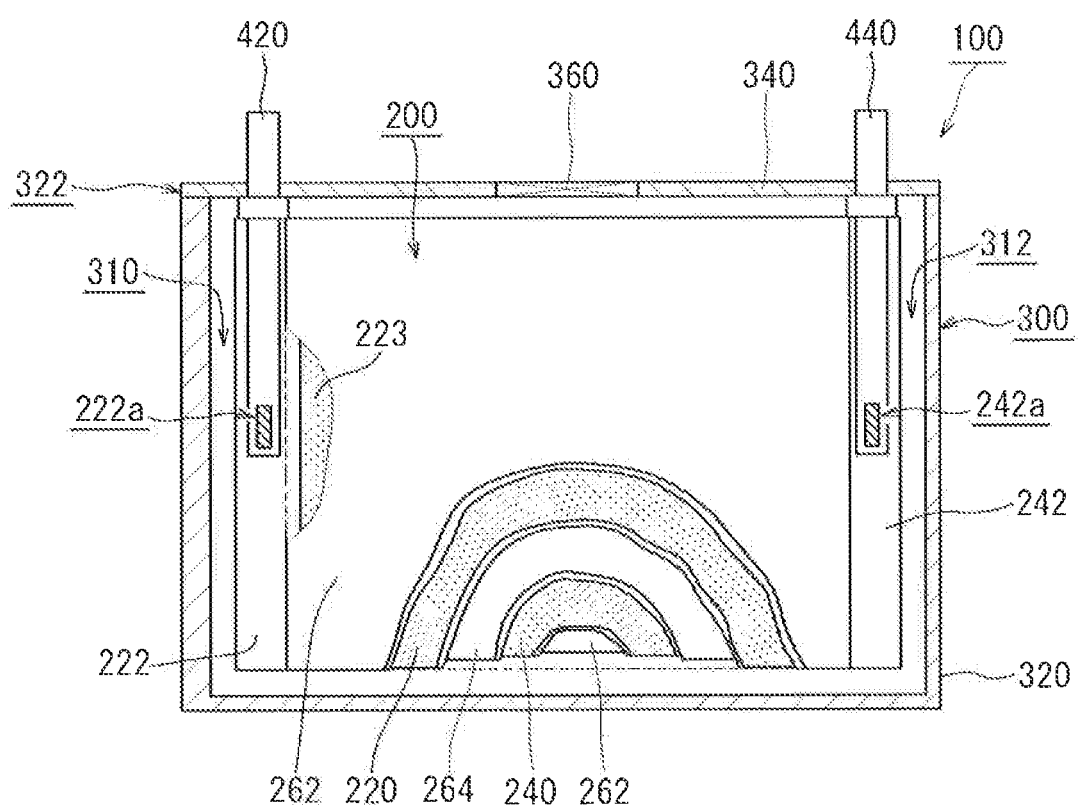
FIG. 1 is a diagram showing an example of a structure of a lithium-ion secondary battery.

Hereinafter, a secondary battery according to an embodiment of the present invention will be described with reference to the drawings. Members and portions that produce same effects are denoted by same reference characters whenever appropriate. In addition, it will be recognized that the respective drawings are merely schematic renderings and therefore are not necessarily actual reflections of the elements shown. First, an example of a structure of a lithium-ion secondary battery will be described. Subsequently, a positive electrode mixture layer of a lithium-ion secondary battery will be described. Finally, an evaluation test of a lithium-ion secondary battery will be described.

Figure 2:
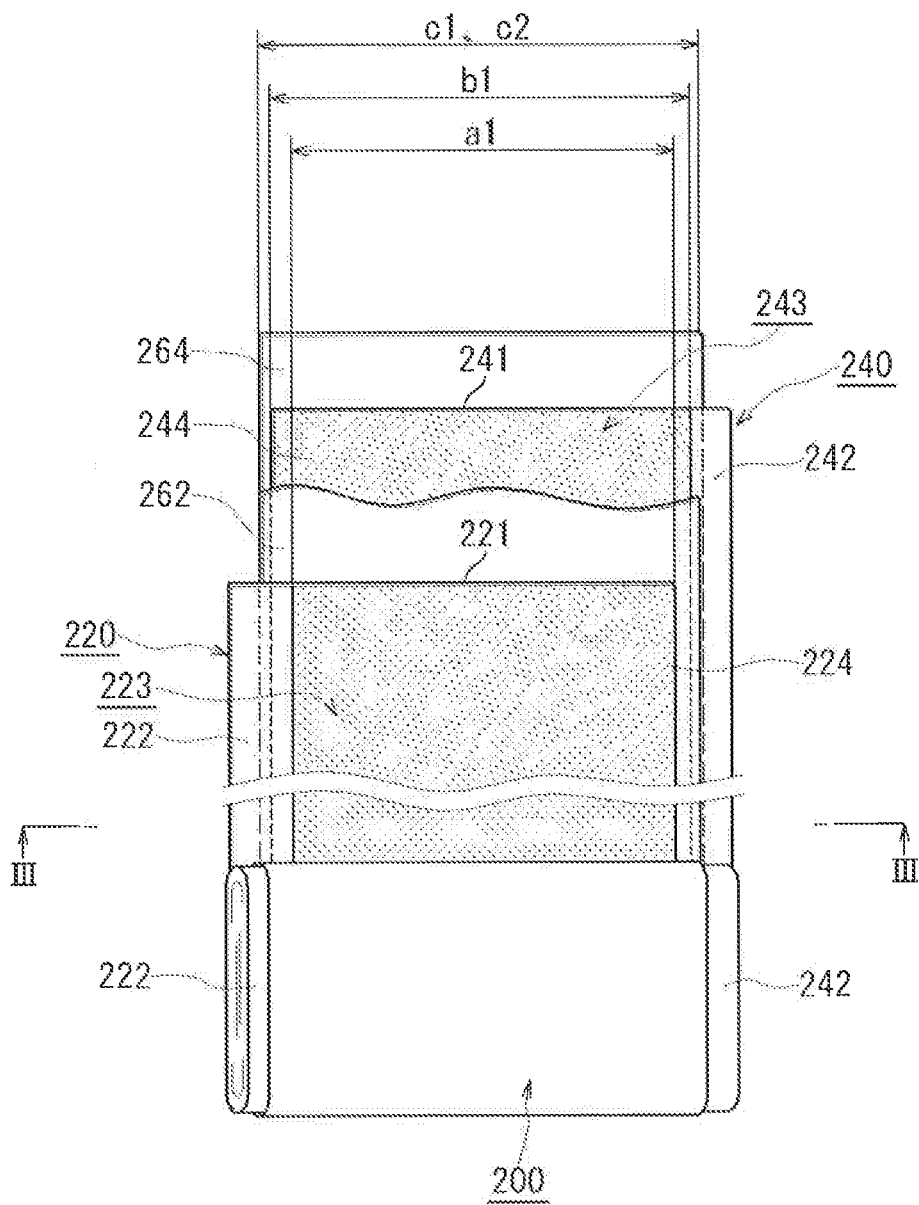
FIG. 2 is a diagram showing a wound electrode body of a lithium-ion secondary battery.
Figure 3:
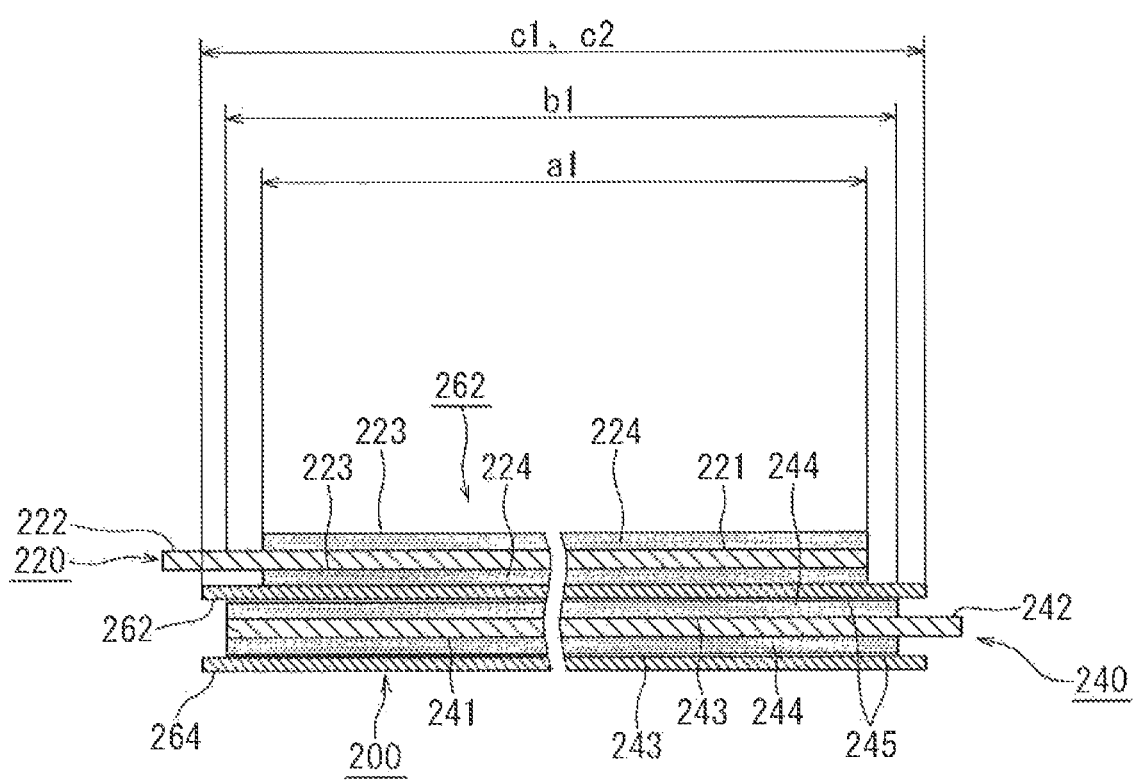
FIG. 3 shows a cross-section taken along line III-III in FIG. 2.

FIG. 1 shows a lithium-ion secondary battery 100. As shown in FIG. 1, the lithium-ion secondary battery 100 comprises a wound electrode body 200 and a battery case 300. Furthermore, FIG. 2 is a diagram showing the wound electrode body 200. FIG. 3 shows a cross-section taken along line III-III in FIG. 2.

<Wound Electrode Body 200>

As shown in FIG. 2, the wound electrode body 200 comprises a positive electrode sheet 220, a negative electrode sheet 240, and separators 262 and 264. The positive electrode sheet 220, the negative electrode sheet 240, and the separators 262 and 264 are respectively band-like sheet materials.

<Positive Electrode Sheet 220>

As shown in FIG. 2, the positive electrode sheet 220 comprises a band-like positive electrode current collector 221 (positive electrode core). A metallic foil suitable for a positive electrode may be preferably used as the positive electrode current collector 221. A band-like aluminum foil having a predetermined width is used as the positive electrode current collector 221. In addition, the positive electrode sheet 220 comprises an uncoated portion 222 and a positive electrode mixture layer 223. The uncoated portion 222 is set along one width-direction edge of the positive electrode current collector 221. The positive electrode mixture layer 223 is a layer coated with a positive electrode mixture 224 containing a positive electrode active material. With the exception of the uncoated portion 222 set on the positive electrode current collector 221, the positive electrode mixture 224 coats both surfaces of the positive electrode current collector 221.

<Positive Electrode Mixture 224, Positive Electrode Active Material>

In this case, the positive electrode mixture 224 is a mixture of a positive electrode active material, an electrically conductive material, a binder, and the like. A material used as a positive electrode active material of a lithium-ion secondary battery can be used as the positive electrode active material. Examples of a positive electrode active material include various lithium transition metal oxides such as $LiNiCoMnO_2$ (lithium-nickel-cobalt-manganese complex oxide), $LiNiO_2$ (lithium nickelate), $LiCoO_2$ (lithium cobaltate), $LiMn_2O_4$ (lithium manganate), and $LiFePO_4$ (iron lithium phosphate). For example, $LiMn_2O_4$ has a spinel structure. In addition, $LiNiO_2$ and $LiCoO_2$ have a layered evaporitic structure. Furthermore, for example, $LiFePO_4$ has an olivine structure. $LiFePO_4$ having an olivine structure includes, for example, particles in the order of nanometers. In addition, $LiFePO_4$ having an olivine structure can be further coated by a carbon film.

<Electrically Conductive Material>

The positive electrode mixture 224 may contain the positive electrode active material as well as other arbitrary components such as an electrically conductive material or a binder as necessary. Examples of the electrically conductive material include carbon materials such as carbon powders and carbon fibers. One type of material selected from such electrically conductive materials may be used alone or two or more types may be used in combination. Examples of carbon powders that can be used include various types of carbon black (such as acetylene black, oil furnace black, graphitized carbon black, carbon black, graphite, and Ketjen black) and graphite powder.

<Binder, Thickener, and Solvent>

For the binder, a polymer can be used which is dispersible or dissolvable in the solvent used. For example, in a positive electrode mixture composition that uses an aqueous solvent, a water-soluble or water-dispersible polymer can be used favorably, examples of which include: cellulose-based polymers (for example, polyvinyl alcohol (PVA) and polytetrafluoroethylene (PTFE)) such as carboxymethyl cellulose (CMC) or hydroxypropyl methyl cellulose (HPMC); fluorine-based resins (for example, a vinyl acetate copolymer and styrene butadiene rubber (SBR)) such as tetrafluoroethylene-hexafluoropropylene copolymer (FEP); and rubbers such as an acrylic acid-modified SBR resin (SBR latex). In addition, in a positive electrode mixture composition that uses a non-aqueous solvent, polymers such as polyvinylidene fluoride (PVDF) or polyvinylidene chloride (PVDC) can be used favorably. In addition to functioning as a binder, the above-mentioned examples of polymer materials can also be used for the purpose of demonstrating a function as a thickener or other additives in the above-mentioned composition. Any aqueous solvent or non-aqueous solvent can be used as the solvent. A preferable example of a non-aqueous solvent is N-methyl-2-pyrrolidone (NMP).

A weight ratio of the positive electrode active material in the entire positive electrode mixture is favorably approximately 50% by weight or more (and typically 50 to 95% by weight), and normally the ratio is more favorably approximately 70 to 95% by weight (for example, 75 to 90% by weight). In addition, the ratio of the electrically conductive material in the entire positive electrode mixture can favorably be, for example, approximately 2 to 20% by weight, and normally the ratio is favorably approximately 2 to 15% by weight. In a composition that uses a binder, the ratio of the binder in the entire positive electrode mixture can be, for example, approximately 1 to 10% by weight, and normally the ratio is favorably approximately 2 to 5% by weight.

<Negative Electrode Sheet 240>

As shown in FIG. 2, the negative electrode sheet 240 comprises a band-like negative electrode current collector 241 (negative electrode core). A metallic foil suitable for a negative electrode may be preferably used as the negative electrode current collector 241. In the present embodiment, a band-like copper foil having a predetermined width is used as the negative electrode current collector 241. In addition, the negative electrode sheet 240 comprises an uncoated portion 242 and a negative electrode mixture layer 243. The uncoated portion 242 is set along one width-direction edge of the negative electrode current collector 241. The negative electrode mixture layer 243 is a layer coated with a negative electrode mixture 244 containing a negative electrode active material. With the exception of the uncoated portion 242 set on the negative electrode current collector 241, the negative electrode mixture 244 coats both surfaces of the negative electrode current collector 241.

<Negative Electrode Mixture 244>

In this case, the negative electrode mixture 244 is a mixture of a negative electrode active material, a thickener, a binder, and the like. A material used as a negative electrode active material of a lithium-ion secondary battery can be used as the negative electrode active material. Examples of a negative electrode active material include carbon-based materials such as natural graphite, artificial graphite, and an amorphous carbon of natural graphite or artificial graphite, lithium transition metal oxide, and lithium transition metal nitride. Moreover, a negative electrode active material is itself electrically conductive. Therefore, an electrically conductive material is added to the negative electrode mixture 244 when necessary. In addition, in this example, a heat-resistant layer (HRL) 245 is further formed on a surface of the negative electrode mixture layer 243 as shown in FIG. 3. The heat-resistant layer 245 is mainly formed of a metal oxide (for example, alumina). Moreover, in this lithium-ion secondary battery 100, the heat-resistant layer 245 is formed on a surface of the negative electrode mixture layer 243. Although not shown, for example, a heat-resistant layer may be formed on surfaces of the separators 262 and 264.

<Negative Electrode Active Material>

Furthermore, one type or two or more types of materials conventionally used in lithium-ion secondary batteries can be used without particular limitation for the negative electrode active material. Examples of these materials include particulate carbon materials (carbon powder) containing a graphite structure (a layered structure) in at least a portion thereof. More specifically, carbon materials having a so-called graphitic structure (graphite), a non-graphitizable carbonaceous structure (hard carbon), a graphitizable carbonaceous structure (soft carbon), or a combination thereof can be used. For example, graphite particles such as natural graphite can be used. Furthermore, an appropriate quantity of a thickener is mixed into the negative electrode mixture in order to maintain dispersion of the negative electrode active material. A thickener, a binder, or an electrically conductive material similar to those used in the positive electrode mixture can be used in the negative electrode mixture.

Although there are no particular limitations thereon, the ratio of the negative electrode active material in the entire negative electrode mixture can be approximately 80% by weight or more (for example, 80 to 99% by weight). Favorably, the ratio of the negative electrode active material in the entire negative electrode mixture is approximately 90% by weight or more (for example, 90 to 99% by weight, and more favorably, 95 to 99% by weight). In a composition that uses a binder, the ratio of the binder in the entire negative electrode mixture can be, for example, approximately 0.5 to 10% by weight, and normally the ratio is favorably approximately 1 to 5% by weight. The positive electrode mixture layer 223 and the negative electrode mixture layer 243 are respectively formed by being coated onto the positive electrode current collector 221 or the negative electrode current collector 241 and by being subsequently subjected to drying and rolling.

<Coating of Mixture>

In the coating step, the positive electrode mixture 224 or the negative electrode mixture 244 is coated onto a sheet-shaped current collector. A conventionally known suitable coating device such as a slit coater, a die coater, a comma coater or a gravure coater can be used for the coating step. In this case, by using an elongated band-like sheet-shaped current collector, the positive electrode mixture 224 or the negative electrode mixture 244 can be continuously coated on the current collector.

<Drying Step>

In the drying step, the positive electrode mixture or the negative electrode mixture coated on the sheet-shaped current collector is dried. When doing so, suitable drying conditions may be set in order to prevent migration. In this case, by using an elongated band-like sheet-shaped current collector and passing the current collector along a guideway provided inside a drying oven, the positive electrode mixture 224 or the negative electrode mixture 244 coated on the current collector can be continuously dried.

<Rolling Step>

Furthermore, in the rolling step, the positive electrode mixture layer 223 or the negative electrode mixture layer 243 dried in the drying step is pressed in a thickness direction to obtain a sheet-shaped positive electrode (positive electrode sheet) having target physical properties. Examples of methods that can be suitably used to carry out the pressing described above include conventionally known roll pressing methods and plate pressing methods.

<Separators 262 and 264>

The separators 262 and 264 are members that separate the positive electrode sheet 220 and the negative electrode sheet 240 from each other. In this example, the separators 262 and 264 are constituted by band-like sheet members with a predetermined width which have a plurality of minute holes. For example, a separator made of a porous polyolefin-based resin and having a single-layer structure or a laminated structure may be used as the separators 262 and 264. In this example, as shown in FIGS. 2 and 3, a width b1 of the negative electrode mixture layer 243 is slightly wider than a width a1 of the positive electrode mixture layer 223. Furthermore, widths c and c2 of the separators 262 and 264 are slightly wider than the width b1 of the negative electrode mixture layer 243 (c1, c2>b1>a1).

<Wound Electrode Body 200>

The positive electrode sheet 220 and the negative electrode sheet 240 of the wound electrode body 200 are laminated and wound with the separators 262 and 264 interposed between the positive electrode sheet 220 and the negative electrode sheet 240.

In this example, as shown in FIG. 2, the positive electrode sheet 220, the negative electrode sheet 240, and the separators 262 and 264 are laminated with their lengthwise directions aligned in an order of: the positive electrode sheet 220, the separator 262, the negative electrode sheet 240, and the separator 264. In doing so, the separators 262 and 264 are laminated onto the positive electrode mixture layer 223 and the negative electrode mixture layer 243. Furthermore, the width of the negative electrode mixture layer 243 is slightly wider than that of the positive electrode mixture layer 223 and the negative electrode mixture layer 243 is laminated so as to cover the positive electrode mixture layer 223. Accordingly, lithium ions (Li) can migrate more reliably between the positive electrode mixture layer 223 and the negative electrode mixture layer 243 during charging and discharging.

In addition, an uncoated portion 222 of the positive electrode sheet 220 and an uncoated portion 242 of the negative electrode sheet 240 are laminated so as to mutually protrude toward opposite sides in the width direction of the separators 262 and 264. The laminated sheet material (for example, the positive electrode sheet 220) is wound around a winding axis set in the width direction.

Moreover, with the wound electrode body 200, the positive electrode sheet 220, the negative electrode sheet 240, and the separators 262 and 264 are wound laminated in a predetermined order. In this process, the respective sheets are laminated while controlling positions thereof using a positioning mechanism such as EPC (edge position control). In doing so, the negative electrode mixture layer 243 is laminated so as to cover the positive electrode mixture layer 223 albeit in a state where the separators 262 and 264 are interposed between the negative electrode mixture layer 243 and the positive electrode mixture layer 223.

<Battery Case 300>

Furthermore, in this example, as shown in FIG. 1, the battery case 300 is a so-called square battery case and comprises a container main body 320 and a lid 340. The container main body 320 has a bottomed square tube shape and is a flat box-shaped container with one side surface (upper surface) opened. The lid 340 is a member which is attached to the opening (upper surface opening) of the container main body 320 and which blocks the opening.

With a vehicle-mounted secondary battery, weight energy efficiency (capacity of battery per unit weight) is desirably improved in order to improve fuel efficiency. Therefore, a light-weight metal such as aluminum or an aluminum alloy (in this example, aluminum) is adopted as the container main body 320 and the lid 340 constituting the battery case 300. Accordingly, weight energy efficiency can be improved.

The battery case 300 has a flat rectangular inner space as a space for housing the wound electrode body 200. In addition, as shown in FIG. 1, a width of the flat inner space of the battery case 300 is slightly greater than the wound electrode body 200. In the present embodiment, the wound electrode body 200 is housed in the inner space of the battery case 300. As shown in FIG. 1, the wound electrode body 200 is housed in the battery case 300 in a state where the wound electrode body 200 is flatly deformed in one direction that is perpendicular to the winding axis.

In the present embodiment, the battery case 300 comprises the container main body 320 having a bottomed square tube shape and the lid 340 that blocks the opening of the container main body 320. In this case, for example, the container main body 320 may be molded by deep-draw molding or impact molding. Impact molding is a type of cold forging and is also referred to as impact extruding and impact pressing.

Furthermore, electrode terminals 420 and 440 are attached to the lid 340 of the battery case 300. The electrode terminals 420 and 440 penetrate the battery case 300 (the lid 340) and reach the outside of the battery case 300. Moreover, a safety valve 360 is provided on the lid 340.

In this example, the wound electrode body 200 is attached to the electrode terminals 420 and 440 which are attached to the battery case 300 (in this example, the lid 340). The wound electrode body 200 is housed in the battery case 300 in a state where the wound electrode body 200 is flatly deformed in one direction that is perpendicular to the winding axis. In addition, in the wound electrode body 200, the uncoated portion 222 of the positive electrode sheet 220 and the uncoated portion 242 of the negative electrode sheet 240 mutually protrude toward opposite sides in the width direction of the separators 262 and 264. Among the electrode terminals, one electrode terminal 420 is fixed to the uncoated portion 222 of the positive electrode current collector 221 and the other electrode terminal 440 is fixed to the uncoated portion 242 of the negative electrode current collector 241.

Figure 4:
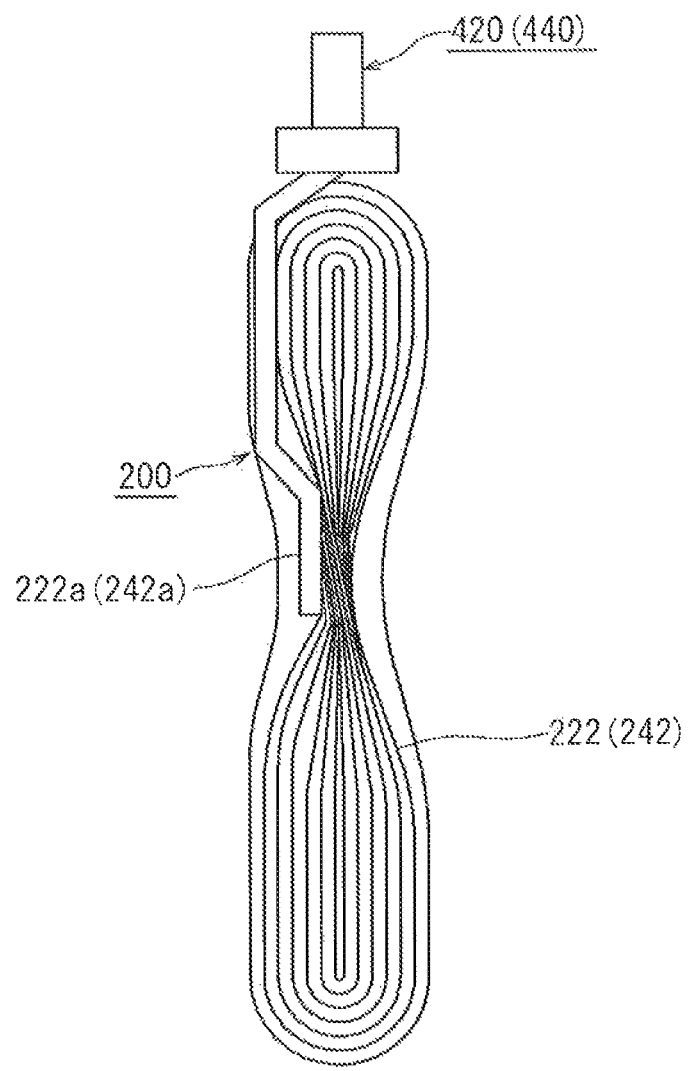
FIG. 4 is a side view showing a welding location of an uncoated portion and an electrode terminal of a wound electrode body.

In addition, in this example, as shown in FIG. 1, the electrode terminals 420 and 440 of the lid 340 extend to intermediate portions 222a and 242a of the uncoated portions 222 and 242 of the wound electrode body 200. Tips of the electrode terminals 420 and 440 are welded to the respective intermediate portions 222a and 242a of the uncoated portions 222 and 242. FIG. 4 is a side view showing a welding location of the uncoated portions 222 and 242 and the electrode terminals 420 and 440 of the wound electrode body 200.

As shown in FIG. 4, on both sides of the separators 262 and 264, the uncoated portion 222 of the positive electrode current collector 221 and the uncoated portion 242 of the negative electrode current collector 241 are spirally exposed. In the present embodiment, the uncoated portions 222 and 242 are respectively assembled at the intermediate portions 222a and 242a thereof and are welded to the tips of the electrode terminals 420 and 440. When doing so, due to differences in the respective materials, for example, ultrasonic welding is used to weld the electrode terminal 420 and the positive electrode current collector 221 to each other. In addition, for example, resistance welding is used to weld the electrode terminal 440 and the negative electrode current collector 241 to each other.

As described above, the wound electrode body 200 is attached to the electrode terminals 420 and 440 fixed to the lid 340 in a state where the wound electrode body 200 is pressed and bent flat. This wound electrode body 200 is housed in the flat inner space of the container main body 320. After the wound electrode body 200 is housed, the container main body 320 is blocked by the lid 340. A joint 322 (refer to FIG. 1) of the lid 340 and the container main body 320 is welded and sealed by, for example, laser welding. As described above, in this example, the wound electrode body 200 is positioned inside the battery case 300 by the electrode terminals 420 and 440 fixed to the lid 340 (the battery case 300).

<Electrolyte Solution>

Subsequently, an electrolyte solution is injected into the battery case 300 from an inlet provided on the lid 340. As the electrolyte solution, for example, an electrolyte solution in which $LiPF_6$ is contained at a concentration of approximately 1 mol/liter in a mixed solvent of ethylene carbonate and diethyl carbonate (for example, a mixed solvent with a volume ratio of around 1:1) is used. Subsequently, a metallic sealing cap is attached (for example, by welding) to the inlet to seal the battery case 300. Moreover, as the electrolyte solution, a non-aqueous electrolyte solution conventionally used in a lithium-ion secondary battery can be used.

<Outgassing Path>

In addition, in this example, the flat inner space of the battery case 300 is slightly wider than the flatly-deformed wound electrode body 200. Gaps 310 and 312 are provided on both sides of the wound electrode body 200 between the wound electrode body 200 and the battery case 300. The gaps 310 and 312 act as outgassing paths.

With the lithium-ion secondary battery 100 configured as described above, temperature rises when an overcharge occurs. When the temperature of the lithium-ion secondary battery 100 rises, the electrolyte solution is decomposed and a gas is generated. The generated gas passes through the gaps 310 and 312 on both sides of the wound electrode body 200 between the wound electrode body 200 and the battery case 300 and through the safety valve 360, and is smoothly discharged to the outside. In this lithium-ion secondary battery 100, the positive electrode current collector 221 and the negative electrode current collector 241 are electrically connected to an external device through the electrode terminals 420 and 440 which penetrate the battery case 300.

<Other Battery Modes>

Moreover, the above description represents an example of a lithium-ion secondary battery. However, lithium-ion secondary batteries are not limited to the mode described above. Similarly, an electrode sheet obtained by coating a metallic foil with an electrode mixture may be used in various other battery modes. For example, a cylindrical battery and a laminated battery are known as other battery modes. A cylindrical battery is a battery in which a wound electrode body is housed in a cylindrical battery case. In addition, a laminated battery is a battery in which a positive electrode sheet and a negative electrode sheet are laminated with a separator interposed between the positive electrode sheet and the negative electrode sheet Moreover, while the lithium-ion secondary battery 100 is exemplified above, secondary batteries other than a lithium-ion secondary battery may also adopt similar structures.

Hereinafter, a positive electrode mixture layer according to the present embodiment will be described.

<Positive Electrode Mixture Layer 223>

Figure 5:
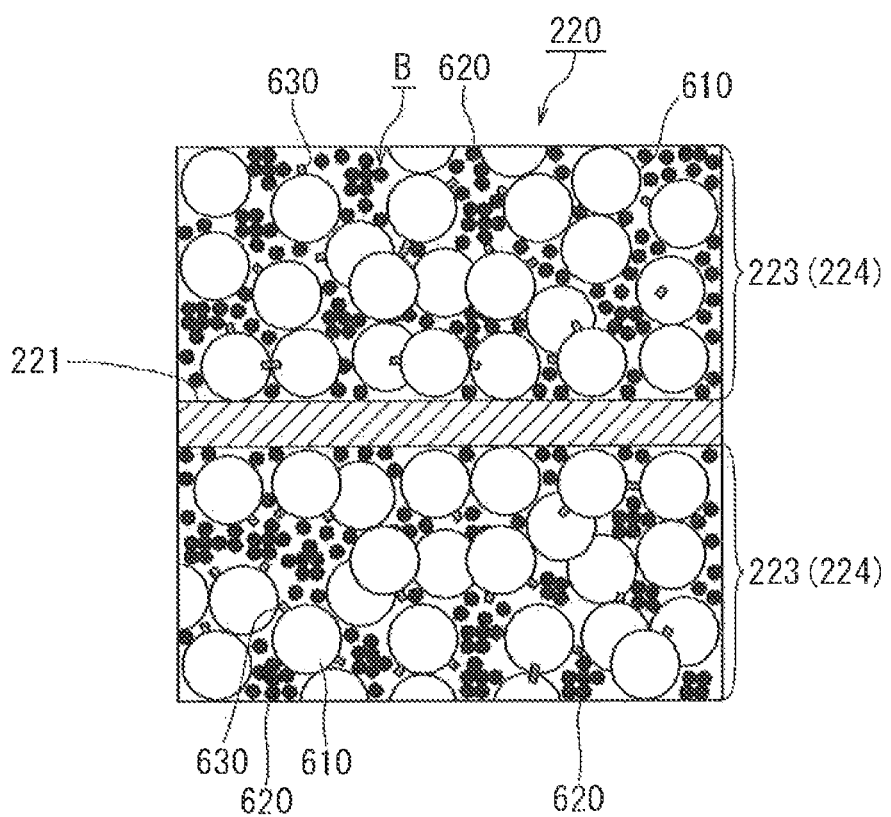
FIG. 5 is a sectional view showing a structure of a positive electrode mixture layer.

FIG. 5 is a sectional view of the positive electrode sheet 220 of the lithium-ion secondary battery 100. In the present embodiment, with the positive electrode sheet 220, both surfaces of the positive electrode current collector 221 are respectively coated by the positive electrode mixture 224 as shown in FIG. 5. This layer of the positive electrode mixture 224 (the positive electrode mixture layer 223) contains a positive electrode active material 610, an electrically conductive material 620, and a binder 630. Moreover, in FIG. 5, the positive electrode active material 610, the electrically conductive material 620, and the binder 630 in the positive electrode mixture layer 223 are schematically depicted enlarged so as to clarify the structure of the positive electrode mixture layer 223.

<Positive Electrode Active Material 610>

In this case, the positive electrode active material 610 is constituted by secondary particles formed by the aggregation of a plurality of primary particles (not shown) of a lithium transition metal oxide. The secondary particles have a particle diameter ranging from approximately 3 μm to 10 μm and more favorably from approximately 3 μm to 8 μm. Here, a median diameter (d50) obtained from a particle size distribution measured by a laser diffractive scattering particle size distribution analyzer is adopted as the particle diameter. For example, LA-920 manufactured by HORIBA, Ltd. can be used as the laser diffractive scattering particle size distribution analyzer. Hereinafter, unless specifically mentioned otherwise, the term "positive electrode active material 610" shall signify secondary particles. In addition, particles that enable aggregation of a plurality of primary particles (not shown) to form secondary particles are favorably used as the positive electrode active material 610. A preferable example of the positive electrode active material 610 favorably contains a lithium-nickel-cobalt-manganese-based complex oxide attributable to a layered structure as a main component. This lithium-nickel-cobalt-manganese-based complex oxide has a hexagonal crystalline system belonging to $\alpha$-NaFeO$_2$ and adopts a layered R3m structure.

<Electrically Conductive Material 620>

In addition, for the electrically conductive material 620, carbon powders such as acetylene black, oil furnace black, graphitized carbon black, carbon black, graphite, Ketjen black, and graphite powder can be used. In this case, one type of a carbon powder or a plurality of types of carbon powder may be mixed at a predetermined ratio for the electrically conductive material 620. Here, the electrically conductive material 620 has a smaller particle diameter than the positive electrode active material 610. For example, the particle diameter of the primary particles of the electrically conductive material 620 ranges from approximately 5 nm to 100 nm and more favorably from approximately 10 nm to 60 nm. Furthermore, a primary structural diameter (which may also be referred to as an aggregate diameter) ranges from approximately 100 nm to 1000 nm and more favorably from approximately 200 nm to 800 nm. A primary structural diameter can be measured using a dynamic scattering particle distribution analyzer. For example, Nanotrac UPA-EX150 manufactured by NIKKISO CO., LTD. can be used as the dynamic scattering particle distribution analyzer.

<Holes B of Positive Electrode Mixture Layer 223>

In the positive electrode mixture layer 223, as shown in FIG. 5, respective particles are bonded to each other due to the effect of the binder 630. As described above, the positive electrode mixture layer 223 is created by coating a positive electrode mixture onto a current collector (metal film), which is then subjected to drying and rolling. Since the positive electrode mixture layer 223 is in a state where the positive electrode active material 610 and the electrically conductive material 620 are bonded by the binder 630, a large number of minute cavities exist between the respective particles. In addition, the electrically conductive material 620 is smaller than the positive electrode active material 610 (secondary particles) and penetrate into a plurality of gaps of the positive electrode active material 610. The positive electrode active material 610 and the positive electrode current collector 221 are electrically connected to each other by the electrically conductive material 620. In addition, the positive electrode mixture layer 223 has minute gaps which may be described as cavities. An electrolyte solution (not shown) penetrates into the minute gaps of the positive electrode mixture layer 223. Here, the gaps (cavities) formed inside the positive electrode mixture layer 233 will be referred to as "holes" when appropriate. For example, holes B of the positive electrode mixture layer 223 include holes between particles of the positive electrode active material 610, holes between particles of the electrically conductive material 620, and holes between particles of the positive electrode active material 610 and particles of the electrically conductive material 620. Furthermore, in some cases, holes also include those formed inside the positive electrode active material 610.

<Operation During Charging>

Figure 14:
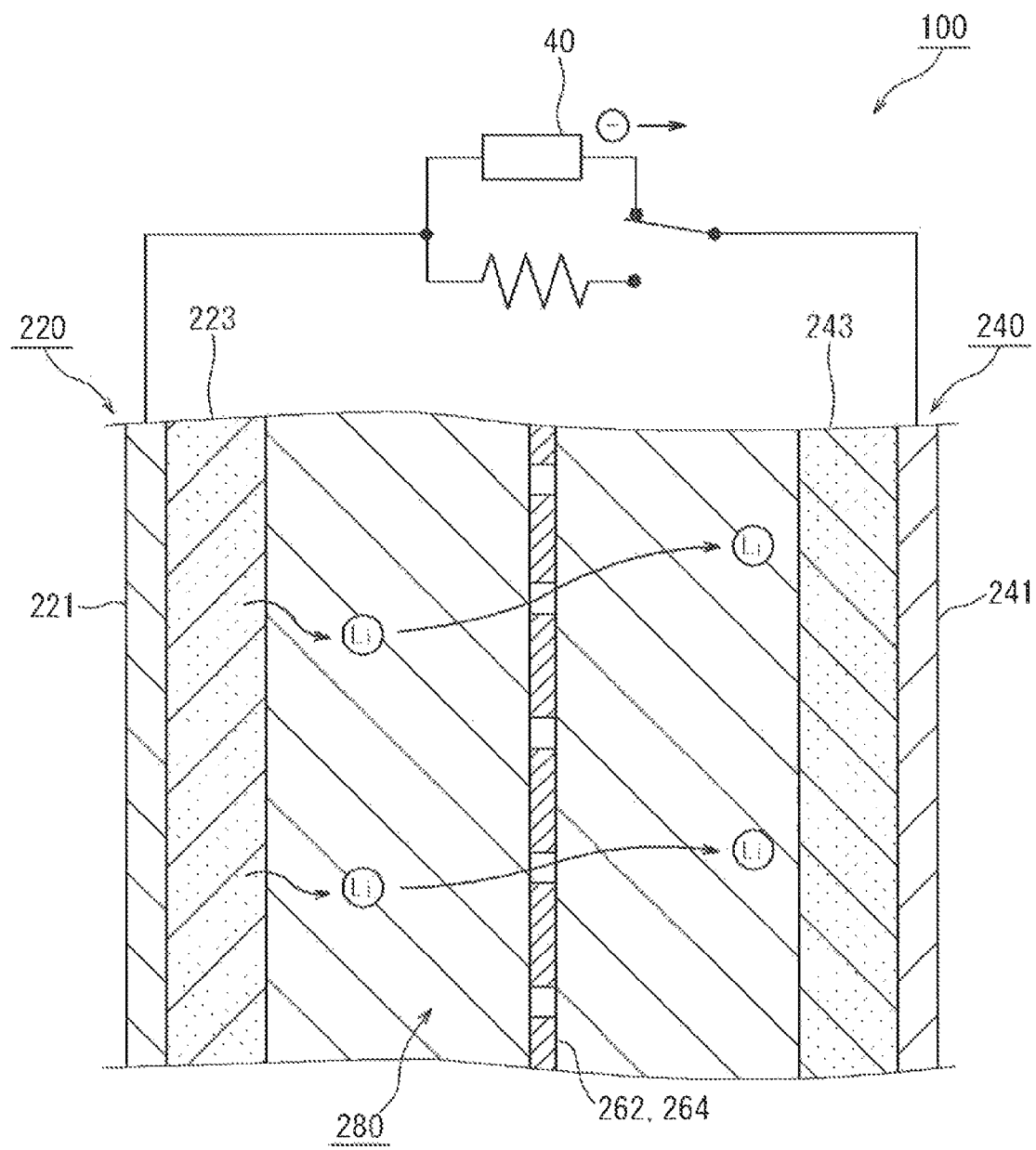
FIG. 14 is a diagram schematically showing a state during charging of a lithium-ion secondary battery.

FIG. 14 schematically shows a state of the lithium-ion secondary battery 100 during charging. During charging, as shown in FIG. 14, the electrode terminals 420 and 440 (refer to FIG. 1) of the lithium-ion secondary battery 100 are connected to a charger 40. Due to the effect of the charger 40, during charging of the secondary battery, lithium ions (Li) are released from the positive electrode active material 610 (refer to FIG. 5) in the positive electrode mixture layer 223 into the electrolyte solution 280 and, at the same time, electrons are emitted by the positive electrode. Meanwhile, at the negative electrode, electrons are stored and the lithium ions (Li) in the electrolyte solution 280 are adsorbed by the negative electrode mixture layer 243. Furthermore, during charging, electrons emitted from the positive electrode active material 610 (refer to FIG. 5) are sent to the positive electrode current collector 221 via the electrically conductive material 620 and are further sent to the negative electrode sheet 240 (refer to FIG. 1) via the charger 40 (refer to FIG. 14).

<Operation During Discharging>

Figure 15:
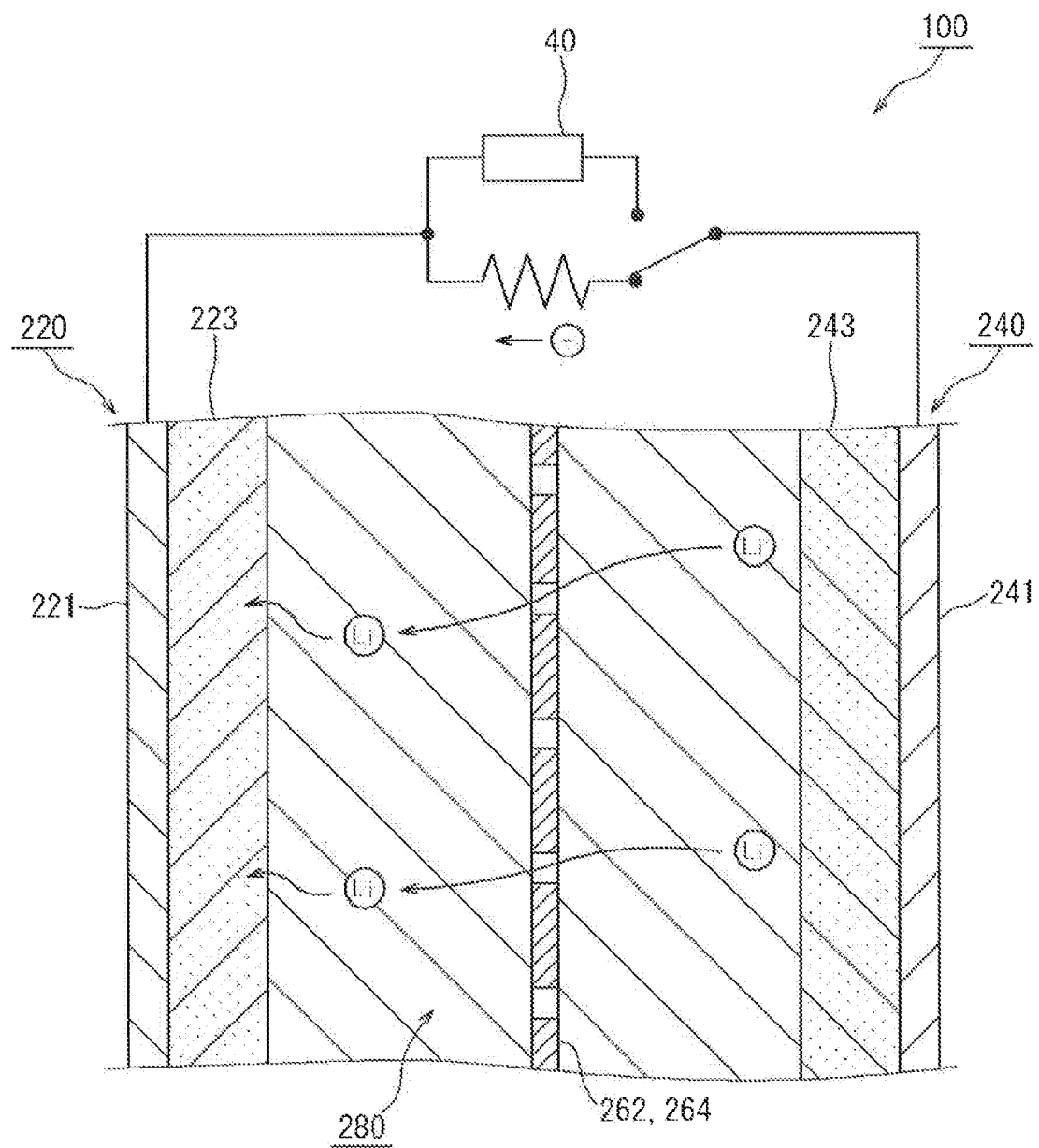
FIG. 15 is a diagram schematically showing a state during discharging of a lithium-ion secondary battery.

FIG. 15 schematically shows a state of the lithium-ion secondary battery 100 during discharging. During discharging, as shown in FIG. 15, electrons are sent from the negative electrode to the positive electrode and lithium ions (Li) are released from the negative electrode mixture layer 243 into the electrolyte solution 280. In addition, at the positive electrode, the lithium ions (Li) in the electrolyte solution 280 are absorbed by the positive electrode active material 610 in the positive electrode mixture layer 223.

In this manner, during charging and discharging of the secondary battery 100, lithium ions (Li) migrate between the positive electrode mixture layer 223 and the negative electrode mixture layer 243 via the electrolyte solution 280. Therefore, the positive electrode mixture layer 223 desirably has necessary holes that allow the electrolyte solution 280 to penetrate around the positive electrode active material 610 (refer to FIG. 5). In other words, necessary holes are desirably present around the positive electrode active material 610 (refer to FIG. 5) in the positive electrode mixture layer 223 so that lithium ions can diffuse around the positive electrode active material 610 (refer to FIG. 5) in the positive electrode mixture layer 223. Due to this configuration, since a sufficient amount of the electrolyte solution can exist around the positive electrode active material 610, lithium ions (Li) can migrate smoothly between the electrolyte solution 280 and the positive electrode active material 610.

In addition, during charging, electrons are sent from the positive electrode active material 610 to the positive electrode current collector 221 via the electrically conductive material 620. In contrast, during discharging, electrons are returned from the positive electrode current collector 221 to the positive electrode active material 610 via the electrically conductive material 620. In this manner, the transfer of electrons between the positive electrode active material 610 and the positive electrode current collector 221 primarily takes place via the electrically conductive material 620.

As shown, during charging, the smoother the migration of the lithium ions (Li) and the transfer of electrons, the higher the efficiency and the speed of charging that can be performed. In addition, during discharging, the smoother the migration of the lithium ions (Li) and the transfer of electrons, the lower the resistance of the battery and the greater the discharge capacity, which results in improved battery output.

<Favorable Mode of Positive Electrode Mixture Layer 223>

As described above, in order to improve output of a secondary battery, a structure is favorable which enables the migration of lithium ions (Li) and the transfer of electrons to be performed smoothly. The present inventors consider that in a preferred mode for improving output, the positive electrode mixture layer 223 favorably has necessary holes around the positive electrode active material 610 into which the electrolyte solution can penetrate and, at the same time, the electrically conductive material 620 is densely aggregated between the positive electrode active material 610 and the positive electrode current collector 221. This is because, in the positive electrode mixture layer 223, the presence of necessary holes around the positive electrode active material 610 into which the electrolyte solution can penetrate conceivably enables lithium ions to diffuse more smoothly at the positive electrode. In addition, dense aggregation of the electrically conductive material 620 between the positive electrode active material 610 and the positive electrode current collector 221 conceivably contributes toward the smooth transfer of electrons at the positive electrode.

As described above, the present inventors consider that, favorably, the positive electrode mixture layer 223 has necessary holes outside and around the positive electrode active material 610 into which the electrolyte solution can penetrate and, at the same time, the electrically conductive material 620 is densely aggregated between the positive electrode active material 610 and the positive electrode current collector 221. Due to this configuration, the output of a secondary battery can be improved.

<State of Holes of Positive Electrode Mixture Layer 223>

A state of the holes of the positive electrode mixture layer 223 can be examined by, for example, the mercury intrusion method using a mercury porosimeter. In the mercury intrusion method, first, a sample of the positive electrode sheet 220 is vacuumed and immersed in mercury. In this state, as pressure applied to the mercury increases, the mercury gradually penetrates into smaller spaces. According to the mercury intrusion method, a volume Vb of holes formed inside the positive electrode mixture layer 223 can be obtained based on a relationship between an amount of mercury having penetrated into the positive electrode mixture layer 223 and the pressure applied to the mercury.

Here, for example, AutoPore III 9410 manufactured by Shimadzu Corporation can be used as the mercury porosimeter. In this case, performing measurement by setting the pressure applied by the measuring instrument on the mercury to within a range of 4 psi to 60,000 psi, a distribution of micropores within a range of approximately 50 μm to 0.003 μm in the positive electrode mixture layer 223 can be measured. Furthermore, when measuring the positive electrode mixture layer 223, for example, the volume of holes contained in the positive electrode mixture layer 223 may be measured using a mercury porosimeter on a plurality of samples cut out from the positive electrode sheet 220 (refer to FIG. 2).

<Porosity (Vb/Va)>

A ratio of holes in the positive electrode mixture layer 223 (porosity) can be expressed as, for example, a ratio (Vb/Va) of a volume Vb of holes formed inside the positive electrode mixture layer 223 to an apparent volume Va of the positive electrode mixture layer 223. Here, this ratio (Vb/Va) will be referred to as "porosity" when appropriate. In addition, whether or not the electrically conductive material 620 is densely aggregated between the positive electrode active material 610 and the positive electrode current collector 221 can be detected based on, for example, sizes of the holes formed between particles of the electrically conductive material 620. The porosity (Vb/Va) can be obtained as a ratio (Vb/Va) of the volume Vb of holes as obtained by the mercury intrusion method and the apparent volume Va of the positive electrode mixture layer 223. In this case, the apparent volume Va of the positive electrode mixture layer 223 can be obtained as a product of a surface area of the positive electrode sheet and a thickness of the positive electrode mixture layer 223. Furthermore, the porosity (Vb/Va) can be approximated by other methods. Another method of measuring the porosity (Vb/Va) will be described below.

<Another Measurement Method of Porosity (Vb/Va)>

For example, the porosity (Vb/Va) can be approximated in a sectional sample of the positive electrode mixture layer 223 such as that shown in FIG. 5 as a ratio (Sb/Sa) of a surface area Sb occupied by holes B included in a unit sectional area of the positive electrode mixture layer 223 and an apparent sectional area Sa of the positive electrode mixture layer 223. In this case, the ratio (Sb/Sa) may be obtained from a plurality of sectional samples of the positive electrode mixture layer 223. The greater the number of sectional samples of the positive electrode mixture layer 223, the more accurate the approximation of the porosity (Vb/Va) by the ratio (Sb/Sa). In this case, for example, sectional samples may be taken along one arbitrary direction of the positive electrode sheet 220 from a plurality of sections perpendicular to the one direction.

For example, the sectional samples of the positive electrode mixture layer 223 may be obtained as sectional SEM images. A sectional SEM image is a sectional photograph taken by an electron microscope. For example, an arbitrary section of the positive electrode sheet 220 may be obtained by a CP process (Cross Section Polisher process). For example, a scanning electron microscope (FE-SEM) HITACHI S-4500 manufactured by Hitachi High-Technologies Corporation can be used as the electron microscope. According to sectional SEM images of the positive electrode mixture layer 223, based on differences in tonality and grayscale, a section A of a component material of the positive electrode mixture layer 223 and holes B formed inside the positive electrode mixture layer 223 can be identified. Porosity measurement methods are not limited to the example described above.

<Micropore Distribution>

Figure 6:
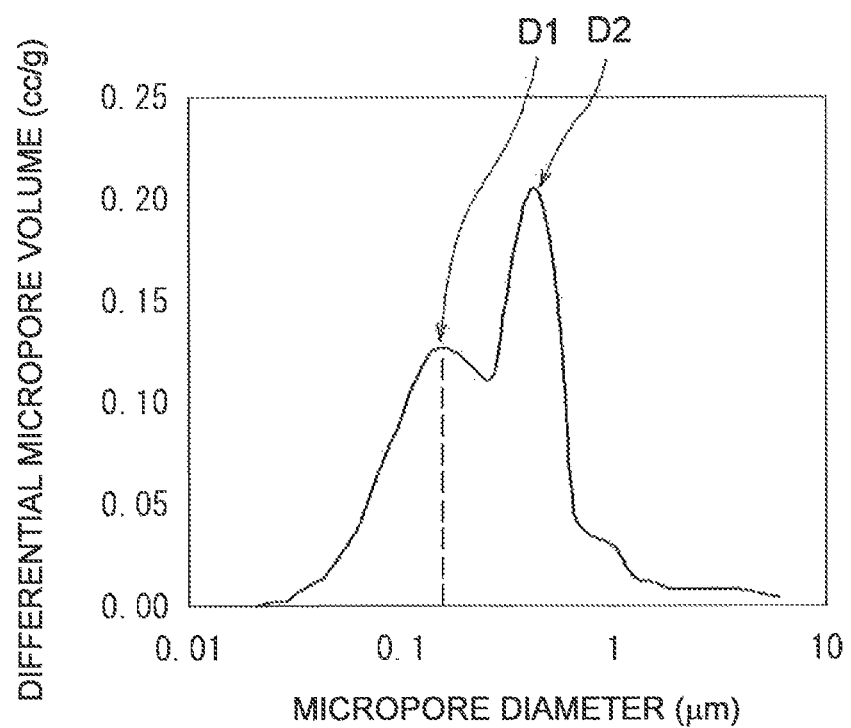
FIG. 6 is a diagram showing an example of a micropore distribution of a positive electrode mixture layer as represented by micropore diameter—differential micropore volume.

The mercury intrusion method may also provide a micropore distribution of the positive electrode mixture layer 223. FIG. 6 shows an example of a typical micropore distribution formed inside the positive electrode mixture layer 223. In this case, micropore distribution is expressed as micropore diameter—differential micropore volume. As shown in FIG. 6, by expressing a typical micropore distribution of the positive electrode mixture layer 223 as micropore diameter—differential micropore volume, approximately two peaks (D1 and D2) appear in the differential micropore volume. Here, among the two peaks (D1 and D2), the peak with the smaller micropore diameter will be referred to as a first peak and the peak with the larger micropore diameter will be referred to as a second peak.

The present inventors performed a detailed study on the two peaks (D1 and D2). As a result, the following findings were made: the first peak micropore diameter D1 is mainly attributable to holes in the electrically conductive material 620, and the micropore diameter D2 of the second peak is mainly attributable to holes in the positive electrode active material 610. Conceivably, the smaller the first peak micropore diameter D1, the smaller the holes in the electrically conductive material 620 and the denser the aggregation of the electrically conductive material 620.

In consideration thereof, the present inventors created a plurality of evaluation test lithium-ion secondary battery samples with different positive electrode mixture layers. Subsequently, with a focus on the porosity (Vb/Va) and the first peak micropore diameter D1 described above, various tests were conducted on each sample. The results of the evaluation test are shown in Table 1.

<Evaluation Test Battery>

Figure 7:
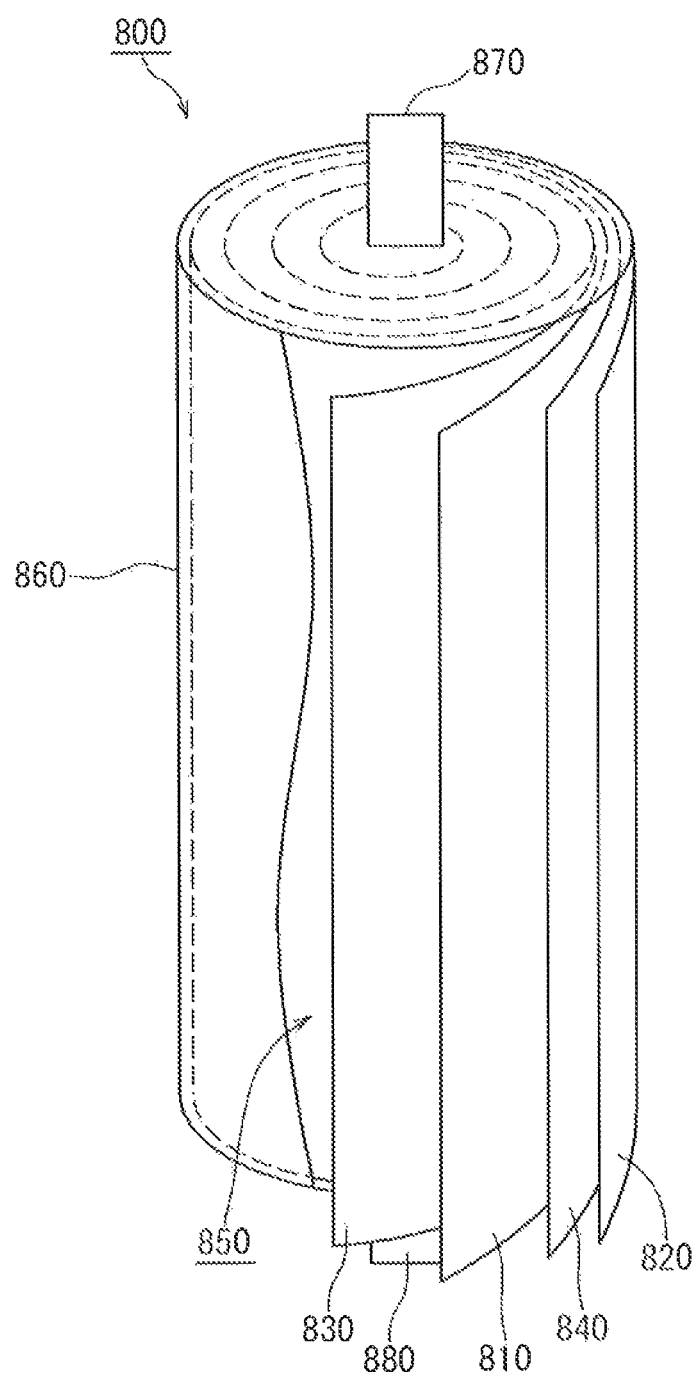
FIG. 7 is a schematic view of an 18650 cell used in an evaluation test.

FIG. 7 schematically shows an evaluation test battery 800. As shown in FIG. 7, the created evaluation test battery 800 is a cylindrical lithium-ion secondary battery commonly referred to as a 18650 cell.

For the evaluation test battery 800, as shown in FIG. 7, a positive electrode sheet 810, a negative electrode sheet 820, and two separators 830 and 840 were laminated, and the laminated sheet was wound to fabricate a wound electrode body 850 in which the separators 830 and 840 were interposed between the positive electrode sheet 810 and the negative electrode sheet 820.

In this case, sectional structures of the positive electrode sheet 810 and the negative electrode sheet 820 of the evaluation test battery 800 were approximately similar to the sectional structures of the positive electrode sheet 220 or the negative electrode sheet 240 of the lithium-ion secondary battery 100 (refer to FIG. 1) described earlier. In addition, a porous polyethylene sheet with a thickness of 20 μm was used as the separators 830 and 840. This wound electrode body 850

TABLE 1

| Sample | Squeeze rate X — | Porosity (Vb/Va) — | First peak micropore diameter D1 μm | DBP absorption Active material mL/100 g | DBP absorption Electrically conductive material mL/100 g | Mixture composition Active material wt % | Mixture composition Electrically conductive material wt % | Mixture composition Binder wt % | 10-second output (25° C.) W | 20 C discharge cycling resistance increase rate (−15° C.) — |
|---|---|---|---|---|---|---|---|---|---|---|
| 1 | 0.200 | 0.30 | 0.169 | 20.1 | 140 | 87 | 10 | 3 | 37.2 | 1.28 |
| 2 | 0.277 | 0.32 | 0.134 | 22.6 | 140 | 87 | 10 | 3 | 39.1 | 1.21 |
| 3 | 0.246 | 0.35 | 0.150 | 22.6 | 140 | 87 | 10 | 3 | 40.8 | 1.25 |
| 4 | 0.174 | 0.41 | 0.185 | 22.6 | 140 | 87 | 10 | 3 | 41.7 | 1.21 |
| 5 | 0.235 | 0.35 | 0.163 | 24.4 | 140 | 87 | 10 | 3 | 40.7 | 1.20 |
| 6 | 0.161 | 0.41 | 0.180 | 24.4 | 140 | 87 | 10 | 3 | 41.6 | 1.22 |
| 7 | 0.265 | 0.41 | 0.139 | 24.4 | 196 | 87 | 10 | 3 | 42.2 | 1.18 |
| 8 | 0.191 | 0.46 | 0.174 | 24.4 | 196 | 87 | 10 | 3 | 43.4 | 1.16 |
| 9 | 0.317 | 0.35 | 0.119 | 24.4 | 196 | 92.2 | 6 | 1.8 | 40.9 | 1.19 |
| 10 | 0.262 | 0.41 | 0.140 | 24.4 | 196 | 92.2 | 6 | 1.8 | 42.1 | 1.18 |
| 11 | 0.187 | 0.46 | 0.177 | 24.4 | 196 | 92.2 | 6 | 1.8 | 43.2 | 1.15 |
| 12 | 0.345 | 0.32 | 0.110 | 35.2 | 140 | 87 | 10 | 3 | 40.3 | 1.21 |
| 13 | 0.316 | 0.35 | 0.120 | 35.2 | 140 | 87 | 10 | 3 | 41.1 | 1.18 |
| 14 | 0.251 | 0.41 | 0.145 | 35.2 | 140 | 87 | 10 | 3 | 42.1 | 1.17 |
| 15 | 0.176 | 0.46 | 0.183 | 35.2 | 140 | 87 | 10 | 3 | 43.1 | 1.20 |
| 16 | 0.403 | 0.35 | 0.099 | 41.1 | 140 | 87 | 10 | 3 | 41.4 | 1.14 |
| 17 | 0.346 | 0.41 | 0.118 | 41.1 | 140 | 87 | 10 | 3 | 42.4 | 1.12 |
| 18 | 0.223 | 0.49 | 0.157 | 41.1 | 140 | 87 | 10 | 3 | 44.2 | 1.09 |
| 19 | 0.142 | 0.55 | 0.210 | 41.1 | 140 | 87 | 10 | 3 | 49.6 | 1.10 |
| 20 | 0.509 | 0.30 | 0.066 | 41.1 | 196 | 87 | 10 | 3 | 40.1 | 1.15 |
| 21 | 0.496 | 0.32 | 0.069 | 41.1 | 196 | 87 | 10 | 3 | 40.9 | 1.12 |
| 22 | 0.475 | 0.35 | 0.078 | 41.1 | 196 | 87 | 10 | 3 | 41.7 | 1.10 |
| 23 | 0.424 | 0.41 | 0.087 | 41.1 | 196 | 87 | 10 | 3 | 43.5 | 1.08 |
| 24 | 0.316 | 0.49 | 0.119 | 41.1 | 196 | 87 | 10 | 3 | 45.3 | 1.06 |
| 25 | 0.244 | 0.55 | 0.136 | 41.1 | 196 | 87 | 10 | 3 | 50.2 | 1.06 |
| 26 | 0.120 | 0.62 | 0.226 | 41.1 | 196 | 87 | 10 | 3 | 52.1 | 1.04 |
| 27 | 0.459 | 0.35 | 0.078 | 52.1 | 140 | 87 | 10 | 3 | 41.6 | 1.10 |
| 28 | 0.407 | 0.41 | 0.091 | 52.1 | 140 | 87 | 10 | 3 | 42.9 | 1.09 |
| 29 | 0.348 | 0.46 | 0.108 | 52.1 | 140 | 87 | 10 | 3 | 44.1 | 1.07 |
| 30 | 0.222 | 0.55 | 0.158 | 52.1 | 140 | 87 | 10 | 3 | 50.0 | 1.05 |
| 31 | 0.111 | 0.60 | 0.234 | 52.1 | 140 | 87 | 10 | 3 | 51.5 | 1.04 |
| 32 | 0.133 | 0.27 | 0.214 | 14.3 | 75 | 87 | 10 | 3 | 18.5 | 3.25 |
| 33 | 0.067 | 0.32 | 0.290 | 14.3 | 75 | 87 | 10 | 3 | 22.8 | 3.89 |
| 34 | 0.286 | 0.20 | 0.127 | 18.9 | 140 | 87 | 10 | 3 | 10.2 | 3.12 |
| 35 | 0.226 | 0.27 | 0.147 | 18.9 | 140 | 87 | 10 | 3 | 20.1 | 3.32 |
| 36 | 0.083 | 0.38 | 0.250 | 18.9 | 140 | 87 | 10 | 3 | 21.7 | 3.91 |
| 37 | 0.091 | 0.46 | 0.260 | 22.6 | 140 | 87 | 10 | 3 | 22.3 | 4.07 |
| 38 | 0.077 | 0.46 | 0.290 | 24.4 | 140 | 87 | 10 | 3 | 20.2 | 4.13 |
| 39 | 0.082 | 0.52 | 0.267 | 39.1 | 140 | 87 | 10 | 3 | 9.1 | 4.25 |
| 40 | 0.092 | 0.57 | 0.254 | 41.1 | 140 | 87 | 10 | 3 | 9.8 | 4.56 |
| 41 | 0.057 | 0.64 | 0.307 | 41.1 | 190 | 87 | 10 | 3 | 5.2 | 4.87 | was housed in an outer case 860 together with a non-aqueous electrolyte solution (not shown) to construct the evaluation test battery 800 (an evaluation test 18650 lithium-ion battery).

Furthermore, for the evaluation test, active material particles having a composition represented by $Li_{1.15}Ni_{0.34}Co_{0.33}Mn_{0.33}O_2$ was used as the positive electrode active material 610. However, the formation process of the active material particles can be elaborated in order to produce secondary particles of the active material particles that are porous or have a hollow form, a near-spherical shape, or shapes that differ from each other. Due to such a difference in structures or due to a difference in average particle diameters in case of a same structure, a difference arises in DBP absorption of the positive electrode active material 610. Here, the average particle diameter (d50) of the secondary particles of the active material particles was set to 3 μm to 12 μm. In addition, for the evaluation test, acetylene black (AB) was used as the electrically conductive material 620. Furthermore, for the evaluation test, N-methyl-2-pyrrolidone (NMP) was used as a solvent. Moreover, polyvinylidene fluoride (PVDF) was used as the binder 630.

In addition, as shown in FIG. 7, the outer case 860 had an approximately cylindrical shape, and electrode terminals 870 and 880 internally connected to the positive electrode sheet 810 and the negative electrode sheet 820 were provided at both side ends of the cylindrical shape. Moreover, as a non-aqueous electrolyte solution for the evaluation test battery 800, a non-aqueous electrolyte solution was used which had a composition obtained by dissolving $LiPF_6$ in a mixed solvent containing EC, DMC and EMC at a volume ratio of 3:3:4 to a concentration of 1 mol/L.

As shown in Table 1, the positive electrode active material 610 and the electrically conductive material 620 respectively having different DBP absorptions were prepared for the evaluation test. In addition, for each sample, a weight ratio of the positive electrode active material 610, the electrically conductive material 620, and the binder 630 contained in the positive electrode mixture 224 was varied. Furthermore, for each sample, the porosity (Vb/Va) and the first peak micropore diameter D1 were varied.

<DBP Absorption>

DBP absorption is obtained in compliance with JIS K6217-4 "Carbon black for rubber industry—Fundamental characteristics—Part 4: Determination of DBP absorption". Here, DBP (dibutylphthalate) is used as a reagent solution to be titrated using a constant-rate burette onto a test object powder (a powder of secondary particles 910 of the positive electrode active material 610), whereby a variation in viscosity characteristics is measured by a torque detector. Subsequently, an additive amount of the reagent solution per unit weight of the test object powder corresponding to a torque equivalent to 70% of a maximum generated torque is adopted as the DBP absorption (mL/100 g). For example, an absorption tester S410 manufactured by Asahisouken Co., Ltd. may be used as the DBP absorption measuring instrument.

The measurement of the DBP absorption (mL/100 g) of the positive electrode active material 610 was performed by setting 60 g of the positive electrode active material 610 to the measuring instrument. In addition, the measurement of the DBP absorption (mL/100 g) of the electrically conductive material 620 was performed by setting 15 g of the electrically conductive material 620 to the measuring instrument.

Moreover, the DBP absorption of the positive electrode active material 610 can also be measured after assembly of the battery. As a method of measuring the DBP absorption of the positive electrode active material 610 after assembly of the battery, for example, the battery is dismantled and the positive electrode sheet 220 (refer to FIG. 2) is removed from the battery. Next, the positive electrode mixture layer 223 is peeled off from the positive electrode current collector 221 of the positive electrode sheet 220. In this case, the positive electrode mixture layer 223 may be scraped off of the positive electrode current collector 221. Next, the positive electrode active material 610, the electrically conductive material 620, and the binder 630 are separated from each other. For example, debris of the positive electrode mixture layer 223 scraped off of the positive electrode current collector 221 may be incinerated to burn away the electrically conductive material 620 and the binder 630 which are mainly composed of carbon components. Accordingly, the positive electrode active material 610 remains. The DBP absorption may be measured based on this positive electrode active material 610.

In this case, as a method of scraping off the positive electrode mixture layer 223 from the positive electrode current collector 221 of the positive electrode sheet 220, for example, the positive electrode sheet 220 may be immersed in an NMP solution (N-methyl-2-pyrrolidone) and then subjected to ultrasonic vibration to scrape the positive electrode mixture layer 223 off of the positive electrode current collector 221. In this case, the NMP solution containing the positive electrode mixture layer 223 scraped off of the positive electrode current collector 221 may be filtered to extract the positive electrode active material 610. Furthermore, this positive electrode active material 610 may be dried. Moreover, when drying the filtered positive electrode active material 610, the positive electrode active material 610 may be incinerated to burn away the electrically conductive material 620 and the binder 630 which are contained as impurities.

Furthermore, dismantling the battery is favorably performed in a state where lithium ions have returned to the positive electrode active material 610. For example, the battery may be dismantled after the battery has been sufficiently discharged.

<Porosity (Vb/Va), First Peak Micropore Diameter D1>

As described earlier, the porosity (Vb/Va) and the first peak micropore diameter D1 of the positive electrode mixture layer 223 can be measured based on the volume Vb of holes and the micropore distribution of the positive electrode sheet 810 of each sample. The volume Vb of holes and the micropore distribution may be measured by the mercury intrusion method.

<Squeeze Rate X>

Figure 8:
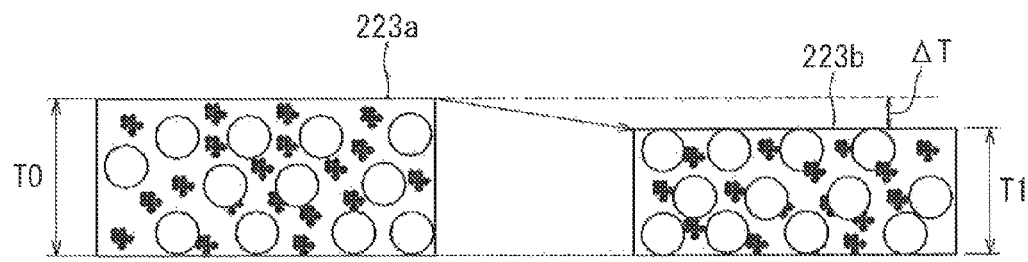
FIG. 8 is a sectional view of a positive electrode mixture layer for describing a squeeze rate X.

In addition, the "squeeze rate X" in Table 1 represents a "squeeze rate X" during the production process of the positive electrode sheet 810 for each sample of the evaluation test battery 800. In this case, as shown in FIG. 8, the "squeeze rate X" is a value obtained by dividing a variation ΔT by which the thickness of the positive electrode mixture layer 223 had varied in the rolling step when forming the positive electrode sheet 810 by a thickness T0 of the positive electrode mixture layer 223a prior to the rolling step (squeeze rate X=ΔT/T0). The variation ΔT by which the thickness of the positive electrode mixture layer 223a had varied is expressed as a difference between the thickness T0 of a positive electrode mixture layer 223a prior to the rolling step and a thickness T1 of a positive electrode mixture layer 223b after the rolling step (ΔT=T0−T1). Moreover, the thickness T0 of the positive electrode mixture layer 223a prior to the rolling step and the thickness T1 of the positive electrode mixture layer 223b after the rolling step do not include the thickness of the positive electrode current collector 221. When the thickness of the positive electrode current collector 221 varies in the rolling step, the thickness of the positive electrode current collector 221 may be excluded. In addition, for example, an average value of the thickness T1 of the positive electrode mixture layer 223b over a predetermined width (for example, 1000 mm) of the positive electrode sheet 220 may be adopted as the thickness T0 of the positive electrode mixture layer 223a prior to the rolling step and the thickness T1 of the positive electrode mixture layer 223b after the rolling step.

Furthermore, for each sample, a plurality of evaluation test batteries 800 were prepared. Same production conditions were applied for the evaluation test batteries 800 for a same sample including production conditions of the positive electrode sheet 810. In addition, conditions other than those listed in Table 1 were set approximately the same among different samples. For example, an aluminum foil with a thickness of 15 μm was used as the positive electrode current collector. Furthermore, the amount of coating by the positive electrode mixture on the positive electrode current collector 221 was set to approximately 15 mg/cm$^2$.

<Conditioning>

Next, a conditioning process, a measurement of rated capacity, and SOC adjustment for the evaluation test batteries constructed as described above will be described in order.

In this case, the conditioning process is performed according to procedures 1 and 2 below.

Procedure 1: After reaching 4.1 V by charging at a constant current of 1 C, pause for 5 minutes.

Procedure 2: After Procedure 1, charge at a constant voltage for 1.5 hours and subsequently pause for 5 minutes.

<Measurement of Rated Capacity>

Next, rated capacity of the evaluation test batteries is measured according to procedures 1 to 3 below after the conditioning process described above at a temperature of 25° C. and within a voltage range of 3.0 V to 4.1 V.

Procedure 1: After reaching 3.0 V by discharging at a constant current of 1 C, discharge at a constant voltage for 2 hours and subsequently pause for 10 seconds.

Procedure 2: After reaching 4.1 V by charging at a constant current of 1 C, charge at a constant voltage for 2.5 hours and subsequently pause for 10 seconds.

Procedure 3: After reaching 3.0 V by discharging at a constant current of 0.5 C, discharge at a constant voltage for 2 hours and subsequently pause for 10 seconds.

Rated capacity: A discharge capacity (CCCV discharge capacity) of discharging from the constant current discharge to the constant voltage discharge in Procedure 3 is adopted as the rated capacity.

<SOC Adjustment>

SOC adjustment is performed on the evaluation test batteries prepared as described above according to procedures 1 and 2 below under a temperature environment of 25° C. In this case, for example, SOC adjustment may be performed after the conditioning process and the rated capacity measurement described above.

Procedure 1: Charge at a constant current of 1 C from 3V to reach a charged state equivalent to approximately 60% of the rated capacity (SOC 60%). Here, "SOC" refers to State of Charge.

Procedure 2: After Procedure 1, charge at a constant voltage for 2.5 hours.

Accordingly, the evaluation test batteries 800 can be adjusted to a predetermined charged state.

Next, the "10-second output (25° C.)" and the "20 C discharge cycling resistance increase rate (−15° C.) in Table I will be described.

<10-Second Output (25° C.)>

A 10-second output (25° C.) is obtained by the following procedures. Moreover, in the present embodiment, the measurement temperature embodiment was set to normal temperature (in this case, 25° C.).

Procedure 1: As SOC adjustment, charge at a constant current of 1 C until SOC 60% is reached, charge at a constant voltage at the SOC 60% for 2.5 hours, and subsequently pause for 10 seconds.

Procedure 2: After Procedure 1, discharge at a constant wattage (W) (constant output) from SOC 60%. Constant wattage discharge is performed by increasing current as voltage decreases due to the discharge so that a same amount of power is discharged per unit time. Then, measure the number of seconds until discharged voltage reaches a predetermined cutoff voltage from the state of SOC 60%.

Procedure 3: Repeat Procedures 1 and 2 by varying constant wattage discharge conditions within a range of 5 W to 50 W in Procedure 2 (refer to FIG. 16). Subsequently, plot respectively measured numbers of seconds until the predetermined cutoff voltage on the abscissa and plot power (W) conditions of constant wattage discharge during the measurements on the ordinate. Finally, calculate W at 10 seconds from an approximate curve.

According to the "10-second output (25° C.)", high-rate output characteristics can be identified. In Table 1, among samples 1 to 41, the higher the numerical value, the higher the output characteristics of the battery.

Figure 16:
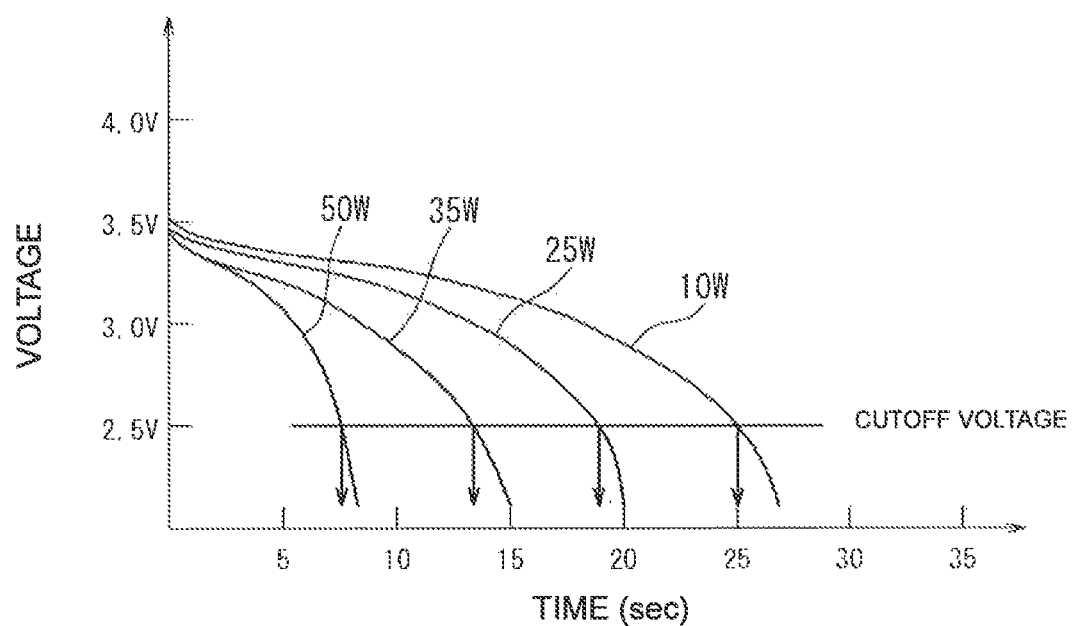
FIG. 16 is a diagram showing a relationship between voltage drop and time of a constant wattage discharge for a 10-second output (25° C.)

With respect to the 10-second output (25° C.), FIG. 16 shows a relationship between voltage drop and time of the constant wattage discharge obtained by Procedure 2.

In this case, for example, as shown in FIG. 16, constant wattage discharge is performed at a predetermined power set within a range of 5 W to 50 W from the state of SOC 60%. With respect to the power of the constant wattage discharge, FIG. 16 shows typical examples of relationships between voltage drop and time (sec) for respective constant wattage discharges at 10 W, 25 W, 35 W, and 50 W. In this case, 2.5 V is set as the predetermined cutoff voltage. Here, as shown in FIG. 16, based on the relationships between voltage drop and time (sec) for respective constant wattage discharges at 10 W, 25 W, 35 W, and 50 W, discharge output (W) of the constant wattage discharge (amount of discharge power of the constant wattage discharge) and the time (sec) until a voltage drop occurs is measured.

Figure 17:
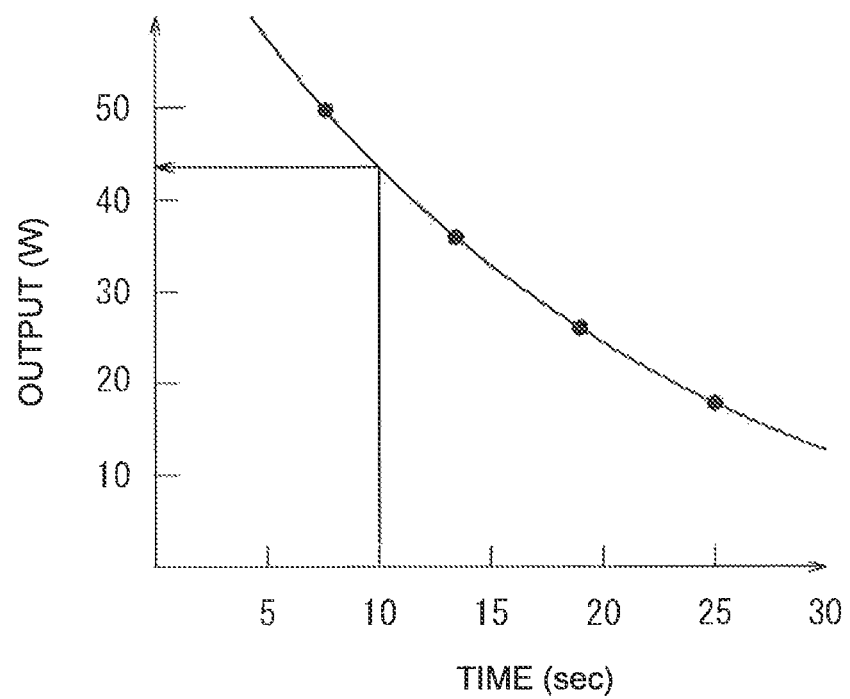
FIG. 17 is a diagram showing an approximate curve obtained by Procedure 3 for a 10-second output (25° C.).

In addition, FIG. 17 shows the approximate curve of Procedure 3 and a method of calculating the 10-second output. In this case, the approximate curve shown in FIG. 17 is prepared as a graph in which time (sec) is set to the abscissa and output (W) is set to the ordinate. In addition, the discharge output (W) of constant wattage discharge and the time (sec) until a voltage drop occurs as obtained from FIG. 16 are plotted onto the graph. An approximate curve is drawn on the plots. Then, based on the approximate curve, discharge output at a position corresponding to 10 seconds on the abscissa of the graph shown in FIG. 17 is obtained as a 10-second output.

<20 C Discharge Cycle Resistance Increase Rate (−15° C.)>

Figure 9:
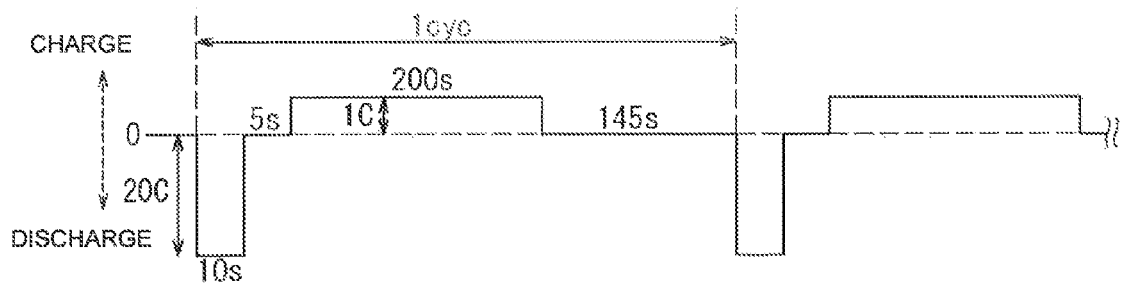
FIG. 9 is a diagram showing a charge-discharge cycle in a high-rate cycling characteristics evaluation test.

For the "20 C discharge cycle resistance increase rate (−15° C.)", after an adjustment is made to a charged state of SOC 60% in a temperature environment of −15° C. by the SOC adjustment described above, charge-discharge cycles in which (I) to (V) below constitute one cycle is repeated 2500 times. The "20 C discharge cycle resistance increase rate (−15° C.)" in Table 1 represents a rate of increase of resistance of the discharge of (I) in the 2500th cycle. Here, FIG. 9 shows a charge-discharge cycle in this characteristic evaluation test. Moreover, this evaluation test is performed using a different evaluation test battery 800 to that used in the "10-second output (25° C.)" evaluation test.

Hereinafter, one charge-discharge cycle constituted by (I) to (V) will be described.

(I) Discharge for 10 seconds at a constant current of 20 C (here, 4.4 A).

(II) Pause for 5 seconds.

(III) Charge for 200 seconds at a constant current of 1 C.

(IV) Pause for 145 seconds.

(V) Measure the rate of increase of resistance during the discharging of (I) for each cycle.

However, the SOC adjustment described above is performed once every 100 repetitions of the charge-discharge cycle constituted by (I) to (V).

<Samples 1 to 41>

Table 1 shows, for samples 1 to 41, a "squeeze rate X", a "porosity (Vb/Va)", a "first peak micropore diameter D1", "DBP absorption (mL/100 g) of positive electrode active material 610 and electrically conductive material 620", the "positive electrode active material 610", the "electrically conductive material 620", the "binder 630", a "10-second output (25° C.)", and a "20 C discharge cycle resistance increase rate (−15° C.)".

As described earlier, according to the reasoning by the present inventors, in order to improve output of a secondary battery, the positive electrode mixture layer 223 favorably has necessary holes around the positive electrode active material 610 into which an electrolyte solution can penetrate. When this concept is considered in terms of the porosity (Vb/Va) described earlier, it is conceivable that the positive electrode mixture layer 223 desirably has a relatively large porosity (Vb/Va) described earlier. Furthermore, according to the reasoning by the present inventors, in order to improve output of a secondary battery, the electrically conductive material 620 is favorably densely aggregated between the positive electrode active material 610 and the positive electrode current collector 221 in the positive electrode mixture layer 223. When this concept is considered in terms of the first peak micropore diameter D1 described earlier, the first peak micropore diameter D1 is desirably relatively small.

With samples having a same DBP absorption (mL/100 g) of the positive electrode active material 610 and the electrically conductive material 620 and a same mixture composition (the weight ratio of the positive electrode active material 610, the electrically conductive material 620, and the binder 630), there is a tendency that the greater the porosity (Vb/Va), the higher the value of the "10-second output (25° C.)" and the lower the value of the "20 C discharge cycle resistance increase rate (−15° C.)". In other words, conceivably, the greater the porosity (Vb/Va) of the positive electrode mixture layer 223, the greater the improvement in characteristics of the secondary battery. Furthermore, even with the same porosity, the smaller the first peak micropore diameter D1, the higher the value of the "10-second output (25° C.)" and the lower the value of the "20 C discharge cycle resistance increase rate (−15° C.)".

For example, as shown in Table 1, samples 2 to 4, samples 5 to 8, samples 9 to 11, samples 12 to 15, samples 16 to 26, and samples 27 to 31 respectively have the same DBP absorption (mL/100 g) of the positive electrode active material 610 and the electrically conductive material 620 and the same mixture composition (the weight ratio of the positive electrode active material 610, the electrically conductive material 620, and the binder 630). In this case, there is a tendency that the higher the porosity (Vb/Va), the higher the value of the "10-second output (25° C.)" and the lower the value of the "20 C discharge cycle resistance increase rate (−15° C.)". Furthermore, for example, as shown by samples 6 and 7, even with the same porosity, the smaller the first peak micropore diameter D1, the higher the value of the "10-second output (25° C.)" and the lower the value of the "20 C discharge cycle resistance increase rate (−15° C.)". As shown, there is a tendency that the smaller the first peak micropore diameter D1, the higher the value of the "10-second output (25° C.)" and the lower the value of the "20 C discharge cycle resistance increase rate (−15° C.)".

In addition, for example, the samples 37 to 41 in Table 1 have values of the "10-second output (25° C.)" and the "20 C discharge cycle resistance increase rate (−15° C.)" that are inferior to those of the samples 1 to 31 even though the samples 37 to 41 have a relatively high porosity (Vb/Va). With the samples 37 to 41 in Table 1, the first peak micropore diameter D1 is relatively large at D1≥0.25. Therefore, it is conceivable that the electrically conductive material 620 in the positive electrode mixture layer 223 are not too densely aggregated. This is conceivably one of the reasons for the inferior values of the "10-second output (25° C.)" and the "20 C discharge cycle resistance increase rate (−15° C.)".

As described as above, once the porosity (Vb/Va) of the positive electrode mixture layer 223 becomes relatively high, the electrolyte solution is able to penetrate sufficiently into the positive electrode mixture layer 223. As a result, lithium ions (Li) can migrate between the positive electrode active material 610 and the electrolyte solution more smoothly. In addition, when the first peak micropore diameter D1 is small, the electrically conductive material 620 in the positive electrode mixture layer 223 is densely aggregated. When the electrically conductive material 620 is densely aggregated, electron transfer occurs more readily between the positive electrode active material 610 and the positive electrode current collector 221. As shown, the output of the secondary battery can conceivably be improved by having a relatively high porosity (Vb/Va) and a relatively small first peak micropore diameter D1.

In consideration of the above, according to findings made by the present inventors, for example, the porosity (Vb/Va) described above may satisfy approximately 0.30≤(Vb/Va) and the first peak micropore diameter D1 may satisfy D1≤0.24 μm. Accordingly, the output of the secondary battery can be generally improved. In addition, due to the tendencies described above, the porosity (Vb/Va) may satisfy 0.30<(Vb/Va) and, more favorably, the porosity (Vb/Va) may satisfy 0.38≤(Vb/Va). Furthermore, the first peak micropore diameter D1 may satisfy D1<0.24 μm or even smaller so as to satisfy D1≤0.20 μm. Moreover, even more favorably, the micropore diameter D1 may satisfy D1≤0.18 μm.

According to this configuration, since the porosity (Vb/Va) of the positive electrode mixture layer 223 is relatively high, a necessary amount of the electrolyte solution penetrates into the positive electrode mixture layer 223 and lithium ions (Li) can migrate more smoothly between the positive electrode active material 610 and the electrolyte solution. In addition, since the first peak micropore diameter D1 is relatively small, in terms of structure, the electrically conductive material 620 is densely aggregated and electron transfer occurs more readily between the positive electrode active material 610 and the positive electrode current collector 221. Therefore, migration of lithium ions (Li) and transfer of electrons at the positive electrode occurs more readily and the output of the secondary battery can be improved.

Furthermore, although an upper limit is not particularly set, the porosity (Vb/Va) may have an appropriate and feasible magnitude. Therefore, the porosity (Vb/Va) may have an appropriate and feasible magnitude and, for example, may be around 0.65. Similarly, a lower limit of the first peak micropore diameter D1 that is mainly attributable to holes in the electrically conductive material 620 is not particularly set. Therefore, the first peak micropore diameter D1 may have an appropriate and feasible size and, for example, may be around 0.05.

Furthermore, in view of the samples 32 to 41, it is conceivable that DBP absorption (mL/100 g) may also influence the output characteristics of the secondary battery. Therefore, when considering the DBP absorption (mL/100 g) of the positive electrode active material 610, the DBP absorption B of the positive electrode active material is more favorably approximately 30 (mL/100 g)≤B. Even more favorably, the DBP absorption B of the positive electrode active material may be 33 (mL/100 g)≤B1. While an upper limit of the DBP absorption B of the positive electrode active material is not particularly set, for example, the DBP absorption B of the positive electrode active material may also satisfy 60 (mL/100 g). In addition, when considering the DBP absorption (mL/100 g) of the electrically conductive material 620, the DBP absorption D of the electrically conductive material 620 may satisfy approximately 100 (m/100 g)<D. While an upper limit of the DBP absorption D of the electrically conductive material 620 is not particularly set, for example, the DBP absorption D of the electrically conductive material 620 may be 300 (mL/100 g).

<Forming Process of Positive Electrode Mixture Layer 223>

Furthermore, as described earlier, a process of forming the positive electrode mixture layer 223 comprises a coating step, a drying step, and a rolling step. In the coating step, the positive electrode mixture 224 containing the positive electrode active material 610 and the electrically conductive material 620 is coated onto the positive electrode current collector 221. In the drying step, the positive electrode mixture 224 coated onto the positive electrode current collector 221 in the coating step is dried. In the rolling step, the positive electrode mixture layer 223 dried in the drying step is rolled. A method of achieving the porosity (Vb/Va) and the first peak micropore diameter D1 described above when performing these steps involves adjusting a rolling quantity (the squeeze rate X) in the rolling step.

Figure 10:
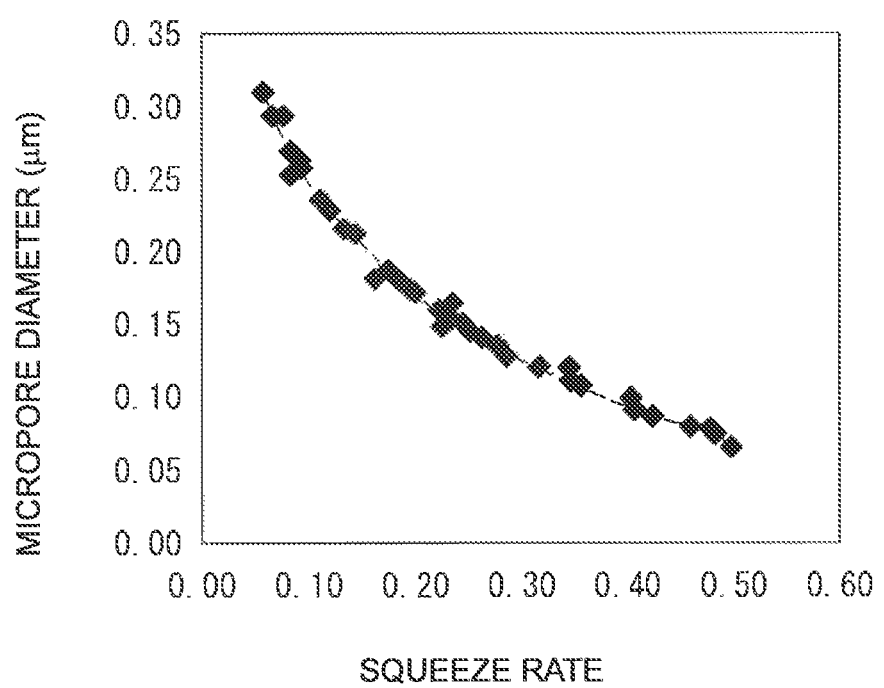
FIG. 10 is a diagram showing a correlation between a squeeze rate X and a micropore diameter D1.

In other words, according to findings made by the present inventors, the first peak micropore diameter D1 described above and the squeeze rate X in the rolling step have a generally correlative relationship as shown in FIG. 10. Therefore, the squeeze rate X may be determined to a certain degree when adjusting the rolling quantity of the rolling step.

In this case, for example, the rolling quantity of the rolling step may be adjusted so that the squeeze rate X is within a range of 0.09≤X≤0.60. The squeeze rate X is a value obtained by dividing a variation ΔT by which a thickness of the positive electrode mixture layer 223 varies due to the rolling step by a thickness T0 of the positive electrode mixture layer 223 prior to the rolling step. Subsequently, after the rolling step, the positive electrode mixture layer 223 that satisfies required conditions 1 and 2 may be obtained, where: condition 1 requires that a ratio (Vb/Va) of a volume Vb of holes formed inside the positive electrode mixture layer 223 after the rolling step to an apparent volume Va of the positive electrode mixture layer 223 after the rolling step satisfies 0.30≤(Vb/Va); and condition 2 requires that, in a micropore distribution of differential micropore volume with respect to micropore diameter as measured by the mercury intrusion method, the positive electrode mixture layer 223 after rolling in the rolling step has a first peak at which a micropore diameter D1 satisfies D1≤0.25 μm and a second peak at which a micropore diameter D2 is greater than the first peak micropore diameter D1.

As described above, the squeeze rate X may be adjusted in the rolling step so that a required porosity (Vb/Va) is obtained and, at the same time, the first peak micropore diameter D1 has a required size. Moreover, conceivably, the greater the squeeze rate X, the smaller the first peak micropore diameter D1 and the denser the electrically conductive material 620 in the positive electrode mixture layer 223. In this case for example, the rolling quantity may be adjusted so that the squeeze rate X satisfies 0.2<X.

In addition, the lower the density of the positive electrode mixture layer 223 after the rolling step, the better. Therefore, the density of the positive electrode mixture layer 223 is favorably set lower even before the rolling step. With the lithium-containing complex oxide described earlier, for example, the density of the positive electrode mixture layer 223 prior to the rolling step may be set to 1.8 g/mL or lower.

<Example of Preferable Positive Electrode Active Material 610>

Hereinafter, a preferable positive electrode active material 610 for achieving the positive electrode mixture layer 223 described above will be exemplified.

As described earlier, there is a tendency that the higher the porosity (Vb/Va) of the positive electrode mixture layer 223, the greater the improvement in output characteristics of the secondary battery. However, with a positive electrode active material 610 consisting of solid particles, there is a limit to increasing porosity (Vb/Va). In addition, there is also a limit to reducing the first peak micropore diameter D1. Therefore, in order to increase the porosity (Vb/Va) and reduce the first peak micropore diameter D1 at the same time, it is important to select a positive electrode active material 610 suitable for this purpose.

For example, conceivably, a desirable mode improves porosity due to holes in the positive electrode active material 610 itself. In addition, reducing the first peak micropore diameter D1 may require significantly adjusting the rolling quantity in the rolling step by, for example, increasing the squeeze rate X. In doing so, even if there are holes in the positive electrode active material 610 itself, it is conceivably required that the positive electrode active material 610 has sufficient strength to withstand the load of the rolling step.

As the positive electrode active material 610, although not shown, the particles of the positive electrode active material 610 may be granulated by spray-drying to obtain a particulate structure having minute holes therein. The porosity (Vb/Va) can also be improved by using such a positive electrode active material 610.

Figure 11:
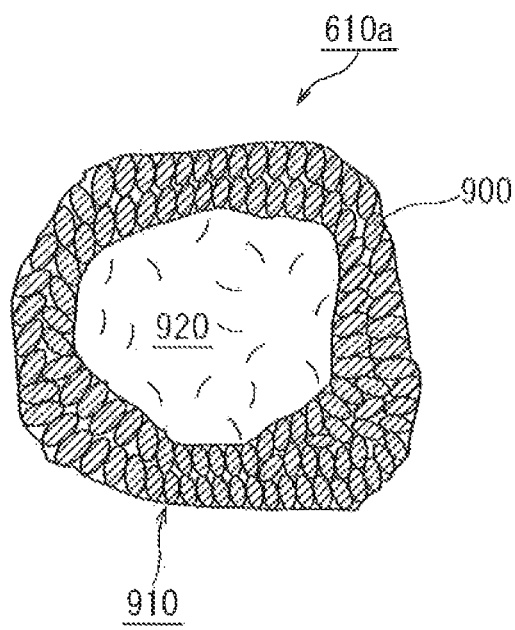
FIG. 11 is a diagram showing an example of positive electrode active material particles.

For example, as shown in FIG. 11, a positive electrode active material 610a may be formed of secondary particles 910 resulting from the aggregation of a plurality of primary particles 900 of a lithium transition metal oxide. In this case, a hollow portion 920 may be formed in the secondary particles 910. According to this positive electrode active material 610a, a hollow portion 920 is formed in the secondary particles 910. Therefore, the porosity (Vb/Va) of the positive electrode mixture layer 223 can be improved. Furthermore, in this mode, a large number of micropores too minute to be illustratable are desirably formed between the primary particles 900 in the secondary particles 910 to create a configuration which enables the electrolyte solution to penetrate into the hollow portion 920. Accordingly, since the primary particles 900 can be utilized also inside the hollow portion 920, the output characteristics of the secondary battery can be improved. Hereinafter, a structure of the positive electrode active material 610 having such a hollow portion 920 will be referred to as a "hollow structure" when appropriate.

Figure 12:
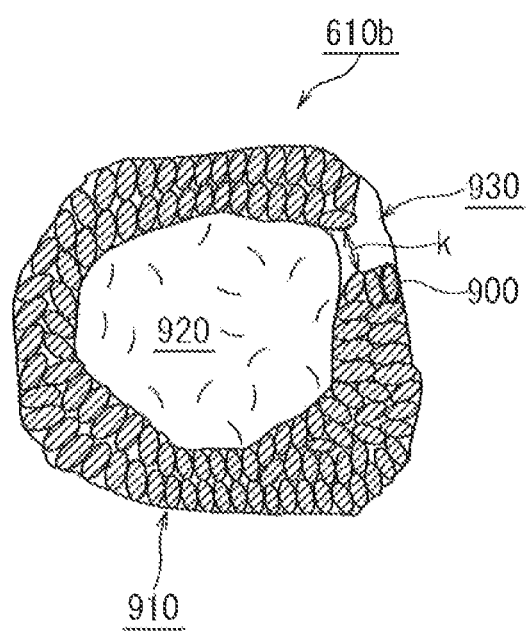
FIG. 12 is a diagram showing an example of positive electrode active material particles.

In addition, as another mode, for example, a positive electrode active material 610 may further have through holes 930 that penetrate the secondary particles 910 so as to connect the hollow portion 920 to the outside as shown in FIG. 12. Hereinafter, a structure of the positive electrode active material 610 having such through holes 930 will be referred to as a "holed hollow structure" when appropriate.

Due to the positive electrode active material 610b, an electrolyte solution is able to migrate more easily between the hollow portion 920 and the outside through the through holes 930 and the electrolyte solution in the hollow portion 920 is appropriately replaced. Therefore, a depletion or a shortage of the electrolyte solution is less likely to occur inside the hollow portion 920. As a result, the primary particles 900 of the positive electrode active material 610 are more actively utilized inside the hollow portion 920. Accordingly, the output characteristics of the secondary battery can be further improved.

In this case, an opening width k of the through holes 930 may be on average 0.01 μm or more. Accordingly, the electrolyte solution can penetrate into the hollow portion 920 more reliably and the effects described above can be more readily obtained. In addition, the opening width k of the through holes 930 may be on average 2.0 μm or less. Here, the opening width k of the through holes 930 refers to the length across a portion where the through holes 930 are narrowest (an inner diameter of the through holes 930) among a path which penetrates through the secondary particles and which extend to the hollow portion 920 from the outside of the active material particles. Moreover, when there are a plurality of through holes 930 in the hollow portion 920, an evaluation may be performed with the through hole 930 having the greatest opening width k among the plurality of the through holes 930. Furthermore, the opening width k of the through holes 930 may be on average 2.0 μm or less, favorably on average 1.0 μm or less, and more favorably on average 0.5 μm or less.

In addition, the number of through holes 930 may be around on average 1 to 20 per one particle of the positive electrode active material 610b and more favorably around on average 1 to 5. According to the positive electrode active material 610b structured in this manner, favorable battery performance can be more stably demonstrated (such as by inhibiting deterioration caused by charge-discharge cycling). Moreover, the number of through holes 930 in the positive electrode active material 610b of the holed hollow structure may be obtained by, for example, ascertaining the number of through holes per particle for at least 10 or more arbitrarily selected active material particles and then determining an arithmetic average thereof. A method of producing the positive electrode active material 610b with this holed hollow structure may include, for example, a raw material hydroxide formation step, a mixing step, and a calcining step.

In this case, the raw material hydroxide formation step is a step of supplying ammonium ions to an aqueous solution of a transition metal compound and precipitating particles of a transition metal hydroxide from the aqueous solution. The aqueous solution favorably contains at least one transition metal element that composes the lithium transition metal oxide. In addition, the raw material hydroxide formation step favorably includes a nucleation stage in which a transition metal hydroxide is precipitated from the aqueous solution at pH 12 or higher and at an ammonium ion concentration of 25 g/L or less and a particle growth stage in which the precipitated transition metal hydroxide is grown at a pH of less than 12 and at an ammonium ion concentration of 3 g/L or more.

Furthermore, the mixing step is a step of mixing particles of the transition metal hydroxide obtained in the raw material hydroxide formation step with a lithium compound to prepare an unfired mixture. Moreover, the calcining step is a step of calcining the mixture obtained in the mixing step to obtain active material particles. According to this production method, the positive electrode active material 610b having a holed hollow structure can be suitably produced.

In addition, in this case, the calcining step may be carried out such that a maximum calcining temperature is 800° C. to 1100° C. (favorably, 800° C. to 1000° C.). As a result, since the primary particles can be adequately sintered, active material particles having a desired average hardness can be preferably produced. This calcining step is favorably carried out so that, for example, secondary particles are formed in which gaps are substantially not present at the grain boundaries of the primary particles at portions other than the hollow portion 920 and the through holes 930.

Furthermore, the calcining step may include a first calcining stage in which the mixture is fired at a temperature T1 of 700° C. to 900° C. and a second calcining stage in which the result of the first calcining stage is fired at a temperature T2 of 800° C. to 1100° C. (favorably, 800° C. to 1000° C.) that is higher than the calcining temperature T1 of the first calcining stage.

In a favorable aspect of the active material particle production method disclosed herein, the calcining step includes a first calcining stage in which the mixture is fired at a temperature T1 of 700° C. to 900° C. and a second calcining stage in which the result of the first calcining stage is fired at a temperature T2 of 800° C. to 1100° C. (favorably, 800° C. to 1000° C.) that is higher than the calcining temperature T1 of the first calcining stage. As a result of calcining the mixture in an aspect that includes these first and second calcining stages, favorable active material particles having a holed hollow structure disclosed herein (refer to the positive electrode active material 610b shown in FIG. 12) can be suitably produced. In addition, for example, by suitably elaborating the calcining step, the positive electrode active material 610a with a "hollow structure" such as that shown in FIG. 11 can be obtained by a similar method.

Furthermore, in this case, BET specific surface areas of the positive electrode active materials 610a and 610b having a hollow structure favorably range from 0.5 to 1.9 $m^2/g$. The positive electrode active materials 610a and 610b having a hollow structure and satisfying the requirement regarding BET specific surface area described above can be used in a positive electrode of the lithium-ion secondary battery 100 and are able to yield a battery that stably demonstrates higher performance. For example, a lithium secondary battery can be constructed which has low internal resistance (or in other words, favorable output characteristics) and which demonstrates little increase in resistance attributable to charge-discharge cycling (particularly, charge-discharge cycling that includes high-rate discharge).

If the BET specific surface area of the active material particles is excessively small, effects of improving battery performance (for example, the effect of reducing internal resistance) tend to decrease. On the other hand, if the BET specific surface area is excessively large, the effect of inhibiting deterioration attributable to charge-discharge cycling tends to decrease. According to the favorable positive electrode active materials 610a and 610b having a hollow structure and satisfying the requirement regarding the BET specific surface area disclosed herein, an improvement of high-rate characteristics (for example, at least one of inhibition of increases in resistance caused by high-rate cycling in the manner of a high-rate cycling test to be subsequently described, and improvement of high-rate discharge performance), and prevention of wear deterioration (for example, at least one of inhibition of increases in resistance with respect to endurance cycling in the manner of an endurance test to be subsequently described, and improvement of capacity retention rate) can be realized simultaneously.

In addition, for example, the positive electrode active material 610a with a "hollow structure" and the positive electrode active material 610b with a "holed hollow structure" may have an average hardness of 0.5 MPa or more as obtained by measuring dynamic hardness under conditions of a loading speed of 0.5 mN/sec to 3 mN/sec using a flat diamond indenter having a diameter of 50 μm.

In another favorable aspect of the active material particles disclosed herein, the average hardness of the positive electrode active material 610a having a hollow structure and the positive electrode active material 610b having a holed hollow structure is roughly 0.5 MPa or more. Here, average hardness refers to a value obtained by measuring dynamic microhardness under conditions of a loading speed of 0.5 mN/sec to 3 mN/sec using a flat diamond indenter having a diameter of 50 μm. For example, a microhardness tester MCT-W201 manufactured by Shimadzu Corporation can be used for the dynamic microhardness measurement. In this manner, active material particles having a hollow structure and high average hardness (or in other words, high shape retention) as shown in FIGS. 11 and 12 are able to yield a battery that stably demonstrates higher performance. Therefore, for example, a contribution can be made to constructing a lithium secondary battery that has low internal resistance (or in other words, favorable output characteristics) and demonstrates little increase in internal resistance attributable to charge-discharge cycling (particularly, charge-discharge cycling that includes high-rate discharge).

In addition, the positive electrode active material 610a having a hollow structure and the positive electrode active material 610b having a holed hollow structure may be a lithium transition metal oxide which has a layered structure and which contains nickel as a constituent element. Furthermore, the positive electrode active material 610a having a hollow structure and the positive electrode active material 610b having a holed hollow structure may be a lithium transition metal oxide which has a layered structure and which contains nickel, cobalt, and manganese as constituent elements.

In addition, for example, the positive electrode active material 610a having a hollow structure and the positive electrode active material 610b having a holed hollow structure favorably have an average particle diameter within a range of approximately 3 μm to 10 μm. Furthermore, an average opening size of the through holes 930 of the positive electrode active material 610b having a holed hollow structure is favorably ½ or less with respect to the average particle diameter of the positive electrode active material 610b. Since the average opening size lies within a suitable range, the positive electrode active material 610b is able to easily secure a desired average hardness while suitably demonstrating effects of improving battery performance (such as the effect of reducing internal resistance) as a result of having a holed hollow structure. Thus, favorable battery performance can be demonstrated more stably.

While an example of a suitable positive electrode active material has been described as a positive electrode active material contained in a positive electrode mixture layer of a secondary battery, the positive electrode active material of a secondary battery according to the present invention is not limited to the above unless specifically mentioned otherwise.

Figure 13:
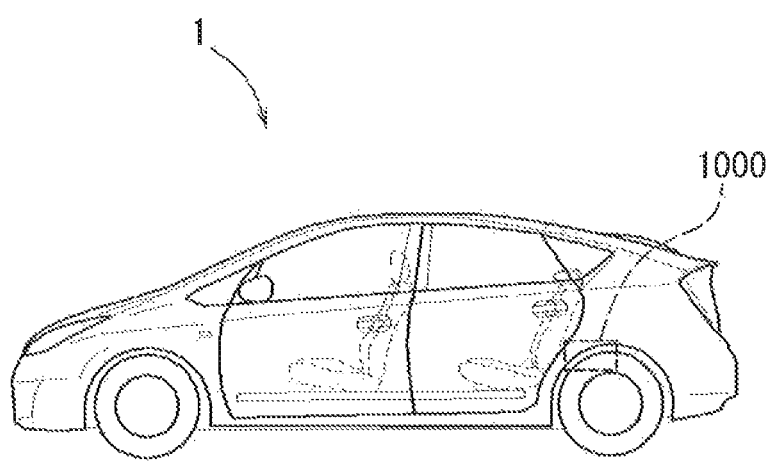
FIG. 13 is a diagram showing an example of a vehicle mounted with a vehicle drive battery.

In addition, the present invention proposes a structure of a positive electrode mixture layer capable of improving output of a secondary battery comprising a positive electrode in which the positive electrode mixture layer is coated onto a current collector. While a lithium-ion secondary battery has been exemplified as the secondary battery, the present invention is not limited to a lithium-ion secondary battery unless specifically mentioned otherwise. Furthermore, the present invention can contribute to improving the output of a secondary battery. Therefore, the structure according to the present invention is particularly preferable for use in a secondary battery used as a vehicle drive power supply such as a drive battery of a hybrid vehicle or an electrical vehicle which is required to have superior high-rate output characteristics and high-rate cycling characteristics. In this case, for example, as shown in FIG. 13, the secondary battery can be preferably used as a vehicle drive battery 1000 for driving a motor of a vehicle 1 such as an automobile in the form of an assembled battery in which a plurality of the secondary batteries are connected in series.

Although a lithium-ion secondary battery according to an embodiment of the present invention has been exemplified and various embodiments of the present invention with respect to a mixture layer of the lithium-ion secondary battery have been described, the present invention is not limited to any of the embodiments above. Moreover, while a lithium-ion secondary battery is exemplified above, the present invention may be applied to structures of positive electrode mixture layers in secondary batteries other than a lithium-ion secondary battery.

REFERENCE SINGS LIST

100 Lithium-Ion Secondary Battery
200 wound electrode body
220 positive electrode sheet
221 positive electrode current collector
222 uncoated portion
222a intermediate portion
223 positive electrode mixture layer
223a positive electrode mixture layer
223b positive electrode mixture layer
224 positive electrode mixture
240 negative electrode sheet
241 negative electrode current collector
242 uncoated portion
243 negative electrode mixture layer
244 negative electrode mixture
245 heat-resistant layer
262 separator
264 separator
300 battery case
310 gap
320 container main body
322 joint of lid and container main body
340 lid
360 safety valve
420 electrode terminal (positive electrode)
440 electrode terminal (negative electrode)
610 positive electrode active material
610a positive electrode active material ("hollow structure")
610b positive electrode active material ("holed hollow structure")

620 electrically conductive material
630 binder
800 evaluation test battery
810 positive electrode sheet
820 negative electrode sheet
830, 840 separator
850 wound electrode body
860 outer case
870 electrode terminal
900 primary particles
910 secondary particles
920 hollow portion
930 through holes
1000 vehicle drive battery

The invention claimed is:

1. A secondary battery comprising:
   a current collector; and
   a positive electrode mixture layer coated on the current collector, wherein
   the positive electrode mixture layer includes a positive electrode active material and an electrically conductive material,
   the positive electrode active material is made up of secondary particles resulting from aggregation of a plurality of primary particles of a lithium-transition metal oxide,
   the secondary particles each have a holed hollow structure that has:
   a hollow portion; and
   a through-hole penetrating the secondary particles so as to connect the hollow portion and an outside of the secondary particles,
   a ratio (Vb/Va) of a volume Vb of holes formed inside the positive electrode mixture layer to an apparent volume Va of the positive electrode mixture layer satisfies $0.30 \leq (Vb/Va)$, and
   in a micropore distribution of differential micropore volume with respect to a micropore diameter as measured by a mercury intrusion method, the positive electrode mixture layer has a first peak at which a micropore diameter D1 satisfies $D1 \leq 0.25$ μm and a second peak at which a micropore diameter D2 is greater than the micropore diameter D1 at the first peak.

2. The secondary battery according to claim 1, wherein the ratio Vb/Va of the volume Vb of holes formed inside the positive electrode mixture layer to the apparent volume Va of the positive electrode mixture layer satisfies $0.38 \leq Vb/Va$.

3. The secondary battery according to claim 1, wherein the ratio Vb/Va satisfies $Vb/Va \leq 0.65$.

4. The secondary battery according to claim 1, wherein the first peak micropore diameter D1 is attributable to holes in the electrically conductive material in the positive electrode mixture layer and the second peak micropore diameter D2 is attributable to holes between particles of the positive electrode active material.

5. The secondary battery according to claim 1, wherein the first peak micropore diameter D1 satisfies $D1 \leq 0.18$ μm.

6. The secondary battery according to claim 1, wherein the first peak micropore diameter D1 satisfies $0.05\ \mu m \leq D1$.

7. The secondary battery according to claim 1, wherein a dibutylphthalate absorption B of the positive electrode active material satisfies $30\ mL/100\ g \leq B$.

8. The secondary battery according to claim 1, wherein a dibutylphthalate absorption D of the electrically conductive material satisfies $100\ mL/100\ g \leq D$.

9. The secondary battery according to claim 1, wherein an opening width of the through hole is on average 0.01 μm or more and 2.0 μm or less.

10. The secondary battery according to claim 1, wherein the positive electrode active material is a positive electrode active material produced by a production method comprising:
    a raw material hydroxide formation step of supplying ammonium ions to an aqueous solution of a transition metal compound, and precipitating particles of the transition metal hydroxide from the aqueous solution, this aqueous solution containing at least one transition metal element that composes the lithium transition metal oxide;
    a mixing step of mixing the transition metal hydroxide with a lithium compound to prepare an unfired mixture; and
    a calcining step of calcining the mixture to obtain the active material particles.

11. The secondary battery according to claim 10, wherein the raw material hydroxide formation step includes:
    a nucleation stage in which the transition metal hydroxide is precipitated from the aqueous solution at pH 12 or higher and at an ammonium ion concentration of 25 g/L or less; and
    a particle growth stage in which the transition metal hydroxide precipitated in the nucleation stage is grown at a pH of less than 12 and at an ammonium ion concentration of 3 g/L or more.

12. A vehicle drive battery constituted by the secondary battery according to claim 1.

13. A secondary battery production method comprising:
    a coating step of coating a current collector with a positive electrode mixture containing a positive electrode active material and an electrically conductive material;
    a drying step of drying the positive electrode mixture coated on the current collector in the coating step; and
    a rolling step of rolling the positive electrode mixture layer dried in the drying step, wherein
    the positive electrode active material is made up of secondary particles resulting from aggregation of a plurality of primary particles of a lithium-transition metal oxide,
    the secondary particles each have a holed hollow structure that has:
    a hollow portion; and
    a through-hole penetrating the secondary particles so as to connect the hollow portion and an outside of the secondary particles,
    a rolling quantity of the rolling step is adjusted within a range of a squeeze rate X satisfying $0.09 \leq X \leq 0.60$ so that a positive electrode mixture layer that satisfies condition 1 and condition 2 below is obtained after the rolling step,
    with the squeeze rate X being a value obtained by dividing a variation ΔT, by which a thickness of the positive electrode mixture layer has varied due to the rolling step, by a thickness T0 of the positive electrode mixture layer prior to the rolling step,
    Condition 1: Condition 1 requires that a ratio Vb/Va of a volume Vb of holes formed inside the positive electrode mixture layer after the rolling step to an apparent volume Va of the positive electrode mixture layer after the rolling step satisfies $0.3 \leq Vb/Va$; and
    Condition 2: Condition 2 requires that, in a micropore distribution of differential micropore volume with respect to a micropore diameter as measured by a mercury intrusion method, the positive electrode mixture layer after rolling in the rolling step has a first peak at which a micropore diameter D1 satisfies $D1 \leq 0.25$ μm and a second peak at which a micropore diameter D2 is greater than the first peak micropore diameter D1.

14. The secondary battery production method according to claim 13, wherein the rolling quantity is adjusted so that the squeeze rate X satisfies 0.2≤X.

15. The secondary battery production method according to claim 13, wherein a density of the positive electrode mixture layer prior to the rolling step is 1.8 or lower.

* * * * *